(12) United States Patent
Tamura et al.

(10) Patent No.: US 11,048,996 B2
(45) Date of Patent: Jun. 29, 2021

(54) INFORMATION PROCESSING APPARATUS, ISING DEVICE, AND INFORMATION PROCESSING APPARATUS CONTROL METHOD

(71) Applicant: FUJITSU LIMITED, Kawasaki (JP)

(72) Inventors: Hirotaka Tamura, Yokohama (JP); Satoshi Matsubara, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 1070 days.

(21) Appl. No.: 15/606,018

(22) Filed: May 26, 2017

(65) Prior Publication Data

US 2017/0351947 A1    Dec. 7, 2017

(30) Foreign Application Priority Data

Jun. 6, 2016    (JP) .............................. JP2016-112488

(51) Int. Cl.
*G06N 3/04* (2006.01)
*G06N 10/00* (2019.01)
*G06N 3/063* (2006.01)
*G06N 3/08* (2006.01)

(52) U.S. Cl.
CPC .............. *G06N 3/04* (2013.01); *G06N 3/063* (2013.01); *G06N 3/08* (2013.01); *G06N 10/00* (2019.01)

(58) Field of Classification Search
CPC .................................. G06N 3/04; G06N 3/08
USPC ......................................................... 706/29
See application file for complete search history.

(56) References Cited

U.S. PATENT DOCUMENTS

| 5,517,600 | A | 5/1996 | Shimokawa | |
|---|---|---|---|---|
| 2016/0063391 | A1* | 3/2016 | Hayashi | G06F 7/588 706/11 |
| 2016/0065210 | A1* | 3/2016 | Yoshimura | H03K 19/0002 326/56 |

FOREIGN PATENT DOCUMENTS

| JP | 3-251947 | 11/1991 |
|---|---|---|
| JP | 6-68056 | 3/1994 |

OTHER PUBLICATIONS

Zhu et al. ("Introducing a Parallel Transit Evalaution Method into the Sequential Boltzmann Machine" 1998) (Year: 1998).*
Wang et al. ("FPGA-based neuromorphic computing system with a scalable routing network" 2015) (Year: 2015).*

(Continued)

*Primary Examiner* — Lut Wong
(74) *Attorney, Agent, or Firm* — Fujitsu Patent Center

(57) ABSTRACT

Ising devices interconnected via buses each include: neuron circuits that each update, when a value of an output signal from one of connection destination neuron circuits changes, a value based on an update signal; a memory holding connection destination information wherein items of address information respectively identifying the destination neuron circuits and the ising devices including these circuits and identification information about weight values are associated with each other; a control circuit that outputs, when an output signal of a destination neuron circuit in an ising device other than the own ising device changes, the value of the changed output signal and the update signal based on the destination information; and a router that receives a mode set value from a control device and determines whether to connect at least two neighboring ising devices, or a neighboring ising device and the control circuit, based on the set value.

7 Claims, 26 Drawing Sheets

(56) References Cited

OTHER PUBLICATIONS

Masuo Suzuki, "Relationship between d-Dimensional Quantal Spin Systems and (d+1)-Dimensional Ising Systems", Progress of Theoretical Physics, vol. 56, No. 5, pp. 1454-1469, Nov. 1976 (16 pages).
Giuseppe E. Santoro et al., "Theory of Quantum Annealing of an Ising Spin Glass", Science vol. 295, pp. 1-8, Mar. 2002 (9 pages).
Koji Hukushima et al., "Exchange Monte Carlo Method and Application to Spin Glass Simulations", arXiv.cond-mat/9512035v1, Dec. 1995 (17 pages).

* cited by examiner

INFORMATION PROCESSING APPARATUS, ISING DEVICE, AND INFORMATION PROCESSING APPARATUS CONTROL METHOD

CROSS-REFERENCE TO RELATED APPLICATION

This application is based upon and claims the benefit of priority of the prior Japanese Patent Application No. 2016-112488, filed on Jun. 6, 2016, the entire contents of which are incorporated herein by reference.

FIELD

The embodiments discussed herein relate to an information processing apparatus, an ising device, and an information processing apparatus control method.

BACKGROUND

Neumann computers are not very suitable for solving multivariable optimization problems. However, to solve these problems, there is a method that uses an ising device (or a Boltzmann machine) that performs simulated annealing using an ising objective function. Such an ising device performs calculation by replacing a problem to be calculated with an ising model, which is a model representing the behavior of a ferromagnetic spin.

However, if an ising device is realized by software simulation, the number of units included in the ising device or the number of connections among the units increases as the number of variables handled by an optimization problem increases. As a result, the calculation time is extended.

There has conventionally been proposed a method of reducing the calculation time by realizing an ising device with hardware modules. There has also been proposed an ising device (also called a quantum computer) that solves an optimization problem by using quantum annealing, instead of simulated annealing.

See, for example, Japanese Laid-open Patent Publication Nos. 3-251947 and 6-68056.

However, an individual unit (bit) of a conventional ising device realized by hardware modules is not connected to all the other bits. Namely, there is a constraint on the number of connections. For example, in the case of a quantum computer whose total bit number is 2,000, an individual quantum bit is connected to six quantum bits. In the case of an ising device whose total bit number is about 20,000 and that performs simulated annealing, an individual bit is connected to five bits.

Since conventional ising devices map and solve problems under this constrain on the number of connections, if the problem size is large, the mapping will be difficult.

In view of the above points, it is an object of the embodiments to provide an information processing apparatus, an ising device, and an information processing apparatus control method that are capable of calculating a large-scale problem in which relatively many variables are used.

SUMMARY

According to one aspect, there is provided an information processing apparatus including: a plurality of ising devices arranged in a matrix and connected to each other via a bus; and a control device, wherein each of the ising devices includes: a plurality of neuron circuits that each hold a first value based on a sum of values each obtained by multiplying one of a plurality of output signals from a plurality of connection destination neuron circuits by one of a plurality of weight values each representing connection strength between a corresponding neuron circuit and one of the plurality of connection destination neuron circuits, outputs 0 or 1 in accordance with a result of comparison between a second value obtained by adding a noise value to the first value with a threshold, receives an update signal when any one of the output signals changes, calculates a change amount of the first value in accordance with the update signal, and updates the first value by adding or subtracting the change amount to or from the first value, a memory that holds connection destination information in which items of first address information that identify the respective connection destination neuron circuits, items of second address information that identify ising devices including the respective connection destination neuron circuits among all the plurality of ising devices, and items of identification information about the respective weight values are associated with each other, a control circuit that outputs, when a first output signal of a first connection destination neuron circuit included in a first ising device other than the ising device including the control circuit among all the plurality of connection destination neuron circuits changes, a value corresponding to the first output signal that has changed and the update signal based on the connection destination information, and a router that receives a mode set value and determines whether to connect at least two neighboring ising devices, or a neighboring ising device and the control circuit in accordance with the mode set value, wherein the control device transmits the mode set value to the router.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
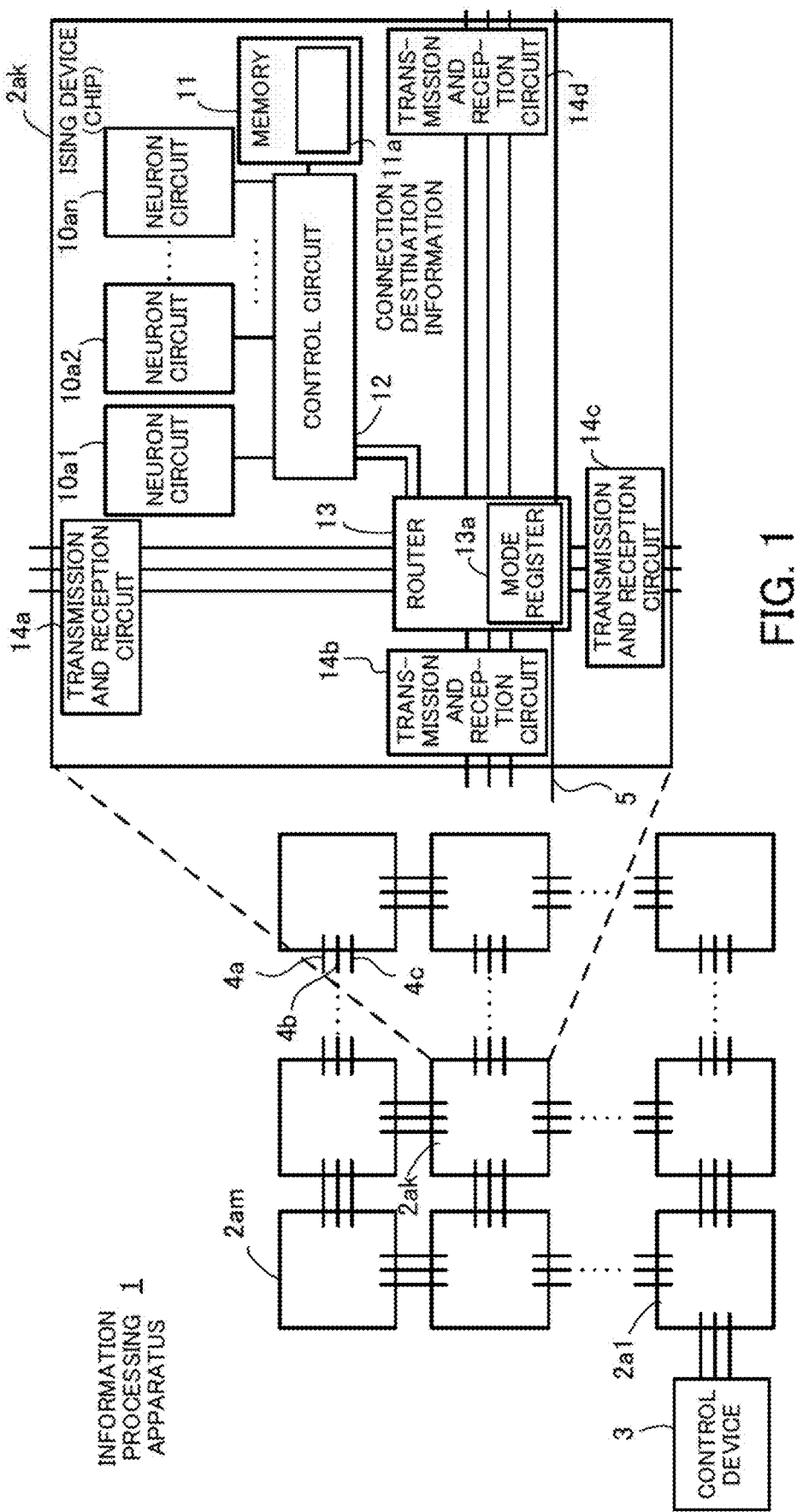
FIG. 1 illustrates an example of an information processing apparatus according to a first embodiment.

Hereinafter, embodiments will be described with reference to the accompanying drawings, wherein like reference characters refer to like elements throughout.

First Embodiment

FIG. 1 illustrates an example of an information processing apparatus 1 according to a first embodiment.

The information processing apparatus 1 includes a plurality of (m) ising devices 2a1 to 2am arranged in a matrix and a control device 3.

For example, each of the ising devices 2a1 to 2am is realized by a single semiconductor integrated circuit (a chip). Of all the ising devices 2a1 to 2am, neighboring ising devices are connectable via buses 4a to 4c. For example, data is transmitted via the bus 4a, addresses are transmitted via the bus 4b, and mode set values are transmitted via the bus 4c.

The connection topology of the ising devices 2a1 to 2am is not limited to the example in FIG. 1. Other examples of the connection topology will be described with reference to FIGS. 21 and 22.

Each of the ising devices 2a1 to 2am includes elements as described below. FIG. 1 illustrates elements included in the ising device 2ak.

The ising device 2ak includes a plurality of (n) neuron circuits 10a1 to 10an, a memory 11, a control circuit 12, a router 13, and transmission and reception circuits 14a to 14d.

For example, a circuit configuration based on an algorithm called "DeGloria algorithm" may be used for the neuron circuits 10a1 to 10an.

Each of the neuron circuits 10a1 to 10an based on the DeGloria algorithm holds a value (a local field value) based on a sum of values each of which is obtained by multiplying one of a plurality of output signals from a plurality of connection destination neuron circuits by one of a plurality of weight values each of which represents connection strength between a corresponding neuron circuit and one of the plurality of connection destination neuron circuits. In addition, each of the neuron circuits 10a1 to 10an outputs 0 or 1 in accordance with a result of comparison between a value obtained by adding a noise value to the corresponding local field value and a threshold (for example, 0). In addition, when any one of the output signals from the plurality of connection destination neuron circuits changes, each of the neuron circuits 10a1 to 10an receives an update signal from the control circuit 12 and calculates a change amount of the local field value in accordance with the update signal. In addition, each of the neuron circuits 10a1 to 10an updates the local field value by adding or subtracting the change amount to or from the local field value prior to the change of the output signal.

An example of a circuit diagram of the neuron circuits 10a1 to 10an will be described below with reference to FIG. 2.

The memory 11 holds connection destination information 11a in which items of address information that identify the connection destination neuron circuits connected to the neuron circuits 10a1 to 10an, items of address information that identify the ising devices including the connection destination neuron circuits, and items of identification information about the weight values are associated with each other. An example of the connection destination information 11a will be described below with reference to FIG. 15.

Hereinafter, each item of address information that identifies a connection destination neuron circuit will be referred to as an internal address, and each item of address information that identifies an ising device will be referred to as a chip address. For example, these internal addresses and chip addresses are determined by the control device 3 in advance in accordance with a problem to be calculated and are stored in a register (not illustrated) (or the memory 11).

For example, a semiconductor storage device such as a flash memory may be used as the memory 11.

When the output signal of a connection destination neuron circuit changes, the control circuit 12 outputs the connection destination information 11a and an update signal based on a value corresponding to the output signal that has changed. For example, the update signal is a value corresponding to the output signal that has changed or a weight value selection signal based on identification information about a corresponding weight value.

The control circuit 12 receives the chip address of the ising device including the connection destination neuron circuit whose output signal value has changed and the internal address of the connection destination neuron circuit via the router 13. Next, the control circuit 12 compares these addresses with the chip addresses and internal addresses stored in the connection destination information 11a. For example, if the received addresses match the internal address and the chip address of any one of the connection destination neuron circuits connected to the neuron circuit 10a1, the control circuit 12 supplies the value corresponding to the output signal that has changed to the neuron circuit 10a1. Next, the control circuit 12 supplies a selection signal for selecting a weight value used by the neuron circuit 10a1 to the neuron circuit 10a1 in accordance with the weight value identification information associated with the internal addresses and the chip addresses.

In addition, when the output signal of any one of the neuron circuits 10a1 to 10an changes, the control circuit 12 supplies a value corresponding to the output signal that has changed and the address (internal address) of the neuron circuit whose output signal has changed to the router 13. Next, the control circuit 12 supplies a section signal based on the weight value identification information between the neuron circuit whose output signal has changed and the other neuron circuits of all the neuron circuits 10a1 to 10an to the other neuron circuits, along with the value corresponding to the output signal that has changed.

For example, the weight value identification information among the neuron circuits in a single ising device is stored in the memory 11. In addition, the connection destination information 11a may include the weight value identification information among the neuron circuits in a single ising device.

For example, the control circuit 12 that performs the above operation may be realized by using a comparator circuit, a selection circuit, etc. The control circuit 12 may be a processor. Examples of the processor include a central processing unit (CPU), a micro processing unit (MPU), a digital signal processor (DSP), an application specific integrated circuit (ASIC), and a programmable logic device (PLD). The processor may be a combination of at least two of a CPU, an MPU, a DSP, an ASIC, and a PLD.

The router 13 receives mode set values and determines whether to connect at least two neighboring ising devices or a neighboring ising device and the control circuit 12 via the buses 4a to 4c in accordance with the mode set values.

The mode set values are stored in a mode register 13a, which includes scan flip flops (scan FFs), for example. Initial values of the mode set values are set by using a signal line 5 and a scan chain including the scan FFs. When the mode set values are changed, for example, the mode set values transmitted via the bus 4c are written in the mode register 13a.

The transmission and reception circuits 14a to 14d are connected to the router 13 and are used to exchange information (mode set values, addresses, data) with the ising devices neighboring the ising device 2ak.

Of all the ising devices 2a1 to 2am, the control device 3 selects an ising device having a neuron circuit whose output signal value is allowed to be updated (annealed). The control device 3 sets the mode set values so that the address of the neuron circuit whose output signal changes, the output signal outputted from the selected ising device, and a value corresponding to the output signal that has changed are supplied to the ising devices including the connection destination neuron circuits connected to this neuron circuit.

In addition, the control device 3 writes weight values in accordance with the problem to be solved in memories of the neuron circuits of the ising devices 2a1 to 2am.

For example, the control device 3 that performs the above operation may be realized by using a processor. Examples of the processor may be a CPU, an MPU, a DSP, an ASIC, or a PLD. The processor may be a combination of at least two of a CPU, an MPU, a DSP, an ASIC, and a PLD. The control device 3 may be a personal computer (PC).

(Example of Neuron Circuits Based on DeGloria Algorithm)

Figure 2:
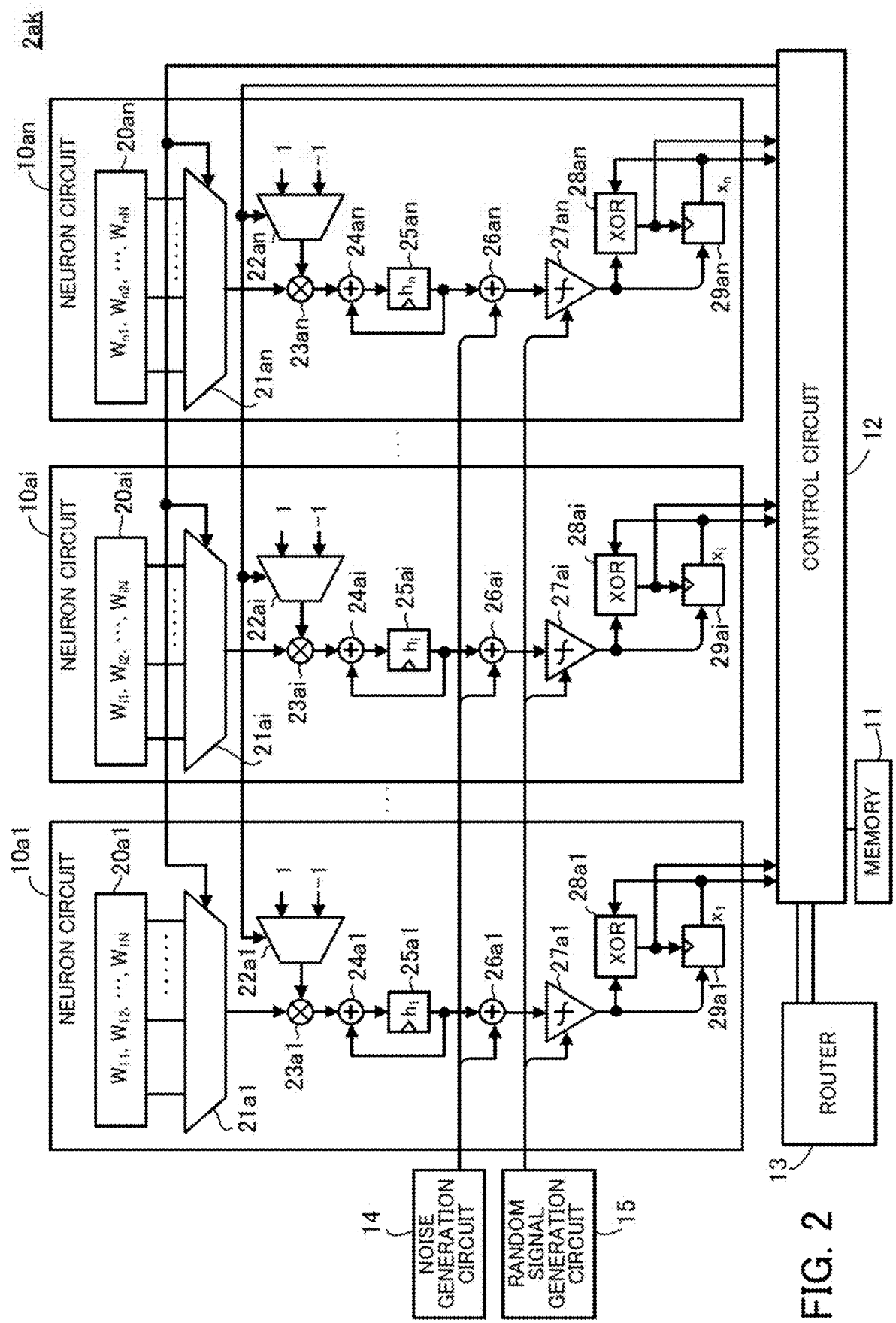
FIG. 2 illustrates an example of neuron circuits.

FIG. 2 illustrates an example of neuron circuits.

FIG. 2 illustrates an example of the neuron circuits 10a1, 10ai, and 10an of the n neuron circuits 10a1 to 10an illustrated in FIG. 1. The neuron circuits other than the neuron circuit 10a1, 10ai, and 10an of the neuron circuits 10a1 to 10an have the same circuit configuration. While not illustrated in FIG. 1, a noise generation circuit 14 and a random signal generation circuit 15 are included in the ising device 2ak.

The neuron circuit 10a1 includes a register 20a1, selection circuits 21a1 and 22a1, a multiplier circuit 23a1, an adder circuit 24a1, a register 25a1, an adder circuit 26a1, a comparator circuit 27a1, an XOR circuit 28a1, and a register 29a1. The neuron circuit 10ai includes a register 20ai, selection circuits 21ai and 22ai, a multiplier circuit 23ai, an adder circuit 24ai, a register 25ai, an adder circuit 26ai, a comparator circuit 27ai, an XOR circuit 28ai, and a register 29ai. The neuron circuit 10an includes a register 20an, selection circuits 21an and 22an, a multiplier circuit 23an, an adder circuit 24an, a register 25an, an adder circuit 26an, a comparator circuit 27an, an XOR circuit 28an, and a register 29an.

The register 20a1 holds N weight values $W_{11}$ to $W_{1N}$, the register 20ai holds N weight value $W_{i1}$ to $W_{iN}$, and the register 20an holds N weight values $W_{n1}$ to $W_{nN}$. The neuron circuits 10a1 to 10an are connected to (N-n) neuron circuits in the ising devices other than the ising device 2ak.

For example, among the weight values $W_{i1}$ to $W_{iN}$ stored in the register 20ai, each of the weight values $W_{i1}$ to $W_{in}$ represents connection strength between the neuron circuit 10ai and one of the other neuron circuits of the neuron circuits 10a1 to 10an in the ising device 2ak. In contrast, among the weight values $W_{i1}$ to $W_{iN}$, each of the weight values $W_{in+1}$ to $W_{iN}$ represents connection strength between the neuron circuit 10ai and one of the (N-n) neuron circuits in the ising devices other than the ising device 2ak. For example, when n=1,024 and N=1,152, the neuron circuit 10ai is connected to 128 neuron circuits in the ising devices other than the ising device 2ak. Needless to say, these numbers n and N are not limited to the above examples.

The control device 3 sets the above weight values in accordance with the problem to be calculated and stores the weight values in the registers 20a1 to 20an. The weight values may be stored in a memory such as a random access memory (RAM).

The selection circuit 21a1 selects and outputs one of the weight values $W_{11}$ to $W_{1N}$ stored in the register 20a1 in accordance with a selection signal supplied by the control circuit 12. The selection circuit 21ai selects and outputs one of the weight values $W_{i1}$ to $W_{iN}$ stored in the register 20ai in accordance with the selection signal. The selection circuit 21an selects and outputs one of the weight values $W_{n1}$ to $W_{nN}$ stored in the register 20an in accordance with the selection signal.

For example, when the output signal of the neuron circuit 10a1 changes, the selection circuits 21a1, 21ai, and 21an of the neuron circuits 10a1, 10ai, and 10an select the weight values $W_{11}$, $W_{i1}$, and $W_{n1}$, respectively, in accordance with the selection signal.

Each of the selection circuits 22a1 to 22an selects and outputs 1 or −1 in accordance with a value (0 or 1) corresponding to the changed output value of a connection destination neuron circuit. This value is outputted from the control circuit 12. When the value corresponding to the output value that has changed is 0, the selection circuits 22a1 to 22an select and output −1. When the value is 1, the selection circuits 22a1 and 22an select and output 1. The reason will be described below.

The multiplier circuit 23a1 outputs a product of the value outputted by the selection circuit 21a1 and the value outputted by the selection circuit 22a1. The multiplier circuit 23ai outputs a product of the value outputted by the selection circuit 21ai and the value outputted by the selection circuit 22ai. The multiplier circuit 23an outputs a product of the value outputted by the selection circuit 21an and the value outputted by the selection circuit 22an.

The adder circuit 24a1 adds up the value outputted by the multiplier circuit 23a1 and the value stored in the register 25a1 and outputs a sum. The adder circuit 24ai adds up the value outputted by the multiplier circuit 23ai and the value stored in the register 25ai and outputs a sum. The adder circuit 24an adds up the value outputted by the multiplier circuit 23an and the value stored in the register 25an and outputs a sum.

The register 25a1 captures the value outputted by the adder circuit 24a1 in synchronization with a clock signal (not illustrated). The register 25ai captures the value outputted by the adder circuit 24ai in synchronization with the clock signal (not illustrated). The register 25an captures the value outputted by the adder circuit 24an in synchronization with the clock signal (not illustrated). The registers 25a1 to 25an are flip flops, for example. The initial values of the registers 25a1 to 25an are bias values described below.

These values captured by the registers 25a1 to 25an are the local field values described above, which are denoted by $h_1$, $h_i$, and $h_n$, respectively, in FIG. 2.

The adder circuit 26a1 adds a noise value outputted by the noise generation circuit 14 to the value outputted by the register 25a1 and outputs a sum. The adder circuit 26ai adds the noise value outputted by the noise generation circuit 14 to the value outputted by the register 25ai and outputs a sum. The adder circuit 26an adds the noise value outputted by the noise generation circuit 14 to the value outputted by the register 25an and outputs a sum. An example of the noise value will be described below.

The comparator circuit 27a1 outputs 1 when the value outputted by the adder circuit 26a1 is larger than a threshold. Otherwise, the comparator circuit 27a1 outputs 0. The comparator circuit 27ai outputs 1 when the value outputted by the adder circuit 26ai is larger than the threshold. Otherwise, the comparator circuit 27ai outputs 0. The comparator circuit 27an outputs 1 when the value outputted by the adder circuit 26an is larger than the threshold. Otherwise, the comparator circuit 27an outputs 0.

When the ising device 2ak performs an annealing operation, one of the comparator circuits 27a1 to 27an is randomly enabled by the random signal generation circuit 15. The other comparator circuits are disabled. For example, the random signal generation circuit 15 may include linear feedback shift registers (LFSRs).

The XOR circuit 28a1 outputs 0 when the value outputted by the comparator circuit 27a1 and the value stored in the register 29a1 match. Otherwise, the XOR circuit 28a1 outputs 1. The XOR circuit 28ai outputs 0 when the value outputted by the comparator circuit 27ai and the value stored in the register 29ai match. Otherwise, the XOR circuit 28ai outputs 1. The XOR circuit 28an outputs 0 when the value outputted by the comparator circuit 27an and the value stored in the register 29an match. Otherwise, the XOR circuit 28an outputs 1.

The register 29a1 captures the value outputted by the comparator circuit 27a1 when the value outputted by the XOR circuit 28a1 is 1. As a result, the output signal (state) $x_1$ of the neuron circuit 10a1 changes (is updated). The register 29ai captures the value outputted by the comparator circuit 27ai when the value outputted by the XOR circuit 28ai is 1. As a result, the output signal (state) $x_i$ of the neuron circuit 10ai changes. The register 29an captures the value outputted by the comparator circuit 27an when the value outputted by the XOR circuit 28an is 1. As a result, the output signal (state) $x_n$ of the neuron circuit 10an changes.

These neuron circuits 10a1 to 10an are small-scale hardware modules that realize an operation of an ising energy function. For example, an ising energy function $E(x)$ is defined by the following expression (1).

$$E(x) = -\sum_{\langle i,j \rangle} W_{ij} x_i x_j - \sum_i b_i x_i \quad (1)$$

The first term on the right side of expression 1 is directed to all the combinations of two neuron circuits selectable from all the neuron circuits without missing any neuron circuit or redundantly counting any neuron circuit. More specifically, the first term represents the sum of products, each of which is obtained by multiplying states of two neuron circuits by a weight value associated with the two neuron circuits. In expression 1, $W_{ij}=W_{ji}$, and $W_{ii}=0$.

The second term on the right side of expression 1 represents the sum of products, each of which is obtained by multiplying a bias value of an individual one of the neuron circuits by a state of the individual one of the neuron circuits. In expression 1, $b_i$ represents the bias value of the i-th neuron circuit.

To express the above energy function $E(x)$ by using hardware modules, the neuron circuits 10a1 to 10an illustrated in FIG. 2 calculate local field values $h_1$ to $h_n$, respectively. For example, the local field value $h_i$ of the neuron circuit 10ai is expressed by the following expression (2).

$$h_i = \sum_j W_{ij} x_j + b_i \quad (2)$$

The first term on the right side of expression 2 represents the sum of products, each of which is obtained by multiplying a weight value representing connection strength between the i-th neuron circuit 10ai and one of the neuron circuits connected to the neuron circuit 10ai by a state of that one neuron circuit.

When the state of only one of the neuron circuits in the information processing apparatus 1 is allowed to be updated at one time, an individual one of the connection destination neuron circuits adds or subtracts the amount of the change made by the update to or from the corresponding original local field value.

For example, when the state $x_j$ (0 or 1) of a neuron circuit connected to the neuron circuit 10ai has changed to $1-x_j$, the change amount $\Delta h_i$ of the local field value of the neuron circuit 10ai is expressed by the following expression (3).

$$\Delta h_i = h_i|_{x_j \to 1-x_j} - h_i = W_{ij}(1-2x_j) \quad (3)$$

In expression (3), $1-2x_j$ represents +1 when the state $x_j$ has changed from 0 to 1 and represents −1 when the state $x_j$ has changed from 1 to 0.

This operation using $1-2x_j$ may be realized by using the selection circuit 22ai illustrated in FIG. 2.

(Example of Noise Value)

In the neuron circuits 10a1 to 10an as illustrated in FIG. 2, to perform simulated annealing, the comparator circuits 27a1 to 27an compare the values obtained by adding a noise value to the local field values $h_1$ to $h_n$ with the above thresholds, respectively.

For example, the noise value is added so that a probability with which an individual one of the output values of the comparator circuits 27a1 to 27an (the states $x_1$ to $x_n$ of the neuron circuits 10a1 to 10an) represents 1 accords with a sigmoid function. For example, the noise value is added so that a probability $P_i(h_i)$ with which the state $x_i$ of the neuron circuit 10ai represents 1 satisfies the relationship of the following expression (4).

$$P_i(h_i)=1/[1+\exp(-h_i/T)] \quad (4)$$

In expression (4), T represents an effective temperature.

To obtain the probability $P_i(h_i)$ as illustrated in expression (4), a probability density function p(ns) of a noise value ns to be added is expressed by the following expression (5).

$$p(ns)=\exp(-h_i/T)/[1+\exp(-h_i/T)]^2 \quad (5)$$

Figure 3:
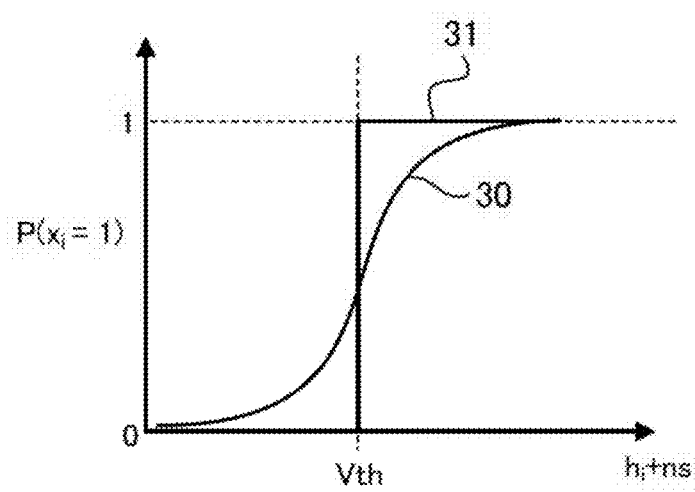
FIG. 3 illustrates an example of a probability $P_i$ ($h_i$) with which a state $x_i$ represents 1.

FIG. 3 illustrates an example of the probability $P_i(h_i)$ with which the state $x_i$ represents 1.

The horizontal axis represents a value obtained by adding the noise value ns to the local field value $h_i$, and the vertical axis represents the probability with which the state $x_i$ represents 1.

A waveform 30 indicates the probability $P_i(h_i)$ with which the state $x_i$ represents 1 when a sum of the noise value ns that accords with the probability density function p(ns) as illustrated in expression (5) and the local field value $h_i$ is inputted to the comparator circuit 27ai. A waveform 31 indicates the probability $P_i(h_i)$ with which the state $x_i$ represents 1 when the local field value $h_i$ is inputted to the comparator circuit 27ai.

As indicated by the waveform 31, if the noise value ns is not added to the local field value $h_i$, when the local field value $h_i$ is equal to or less than a threshold Vth, $P_i(h_i)=0$. However, when the local field value $h_i$ exceeds the threshold Vth, $P_i(h_i)=1$.

In contrast, as indicated by the waveform 30, if the noise value ns is added to the local field value $h_i$, the probability $P_i(h_i)$ changes with the sigmoid function.

(Setting of Initial Values of Chip Addresses and Mode Set Values)

Figure 4:
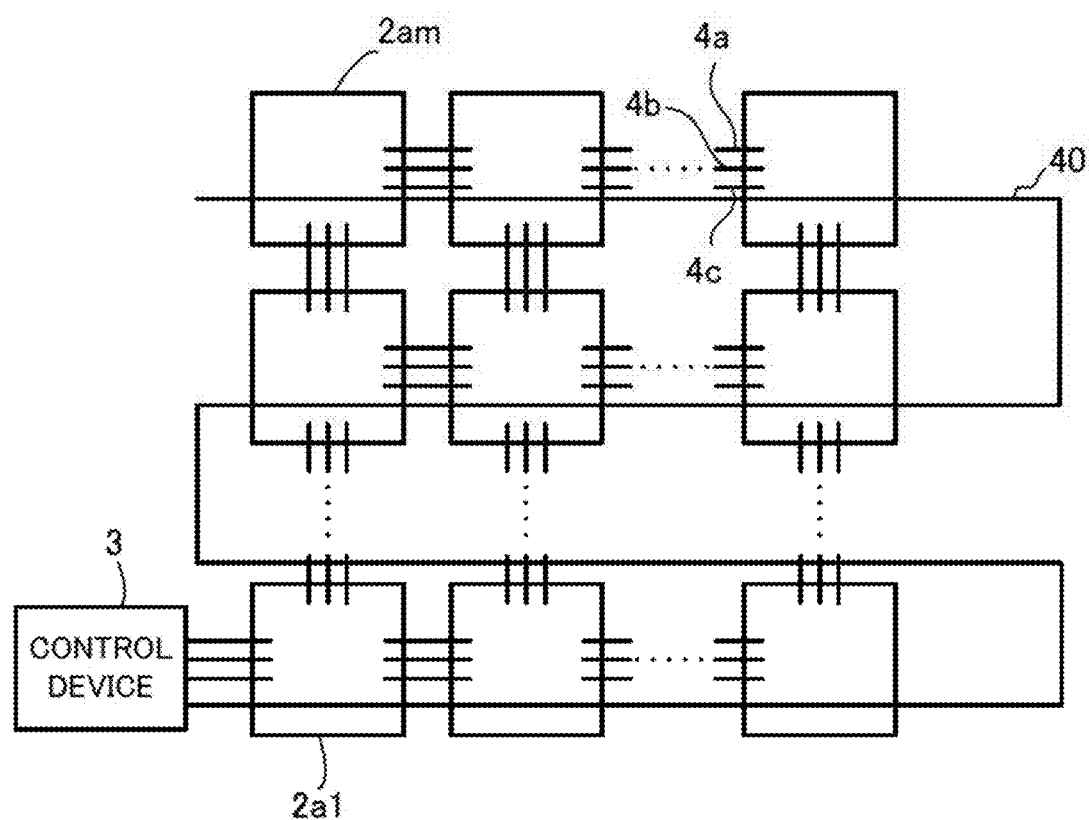
FIG. 4 illustrates an example of a method of setting initial values of chip addresses and mode set values.

FIG. 4 illustrates an example of a method of setting initial values of chip addresses and mode set values.

For example, the ising devices 2a1 to 2am are connected to a single scan chain 40. The control device 3 uses the scan chain 40 to set initial values of chip addresses and mode set values in the ising devices 2a1 to 2am.

Figure 5:
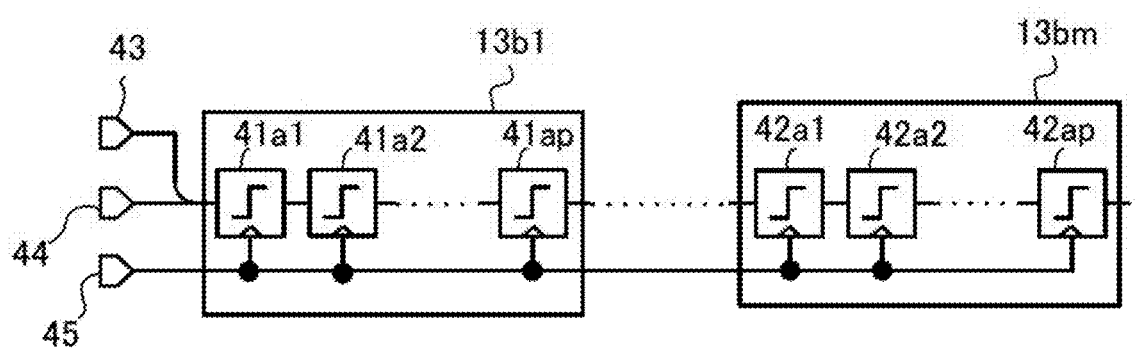
FIG. 5 illustrates an example of scan FFs that set chip addresses.

FIG. 5 illustrates an example of scan FFs that set chip addresses.

Scan FF units 13b1 to 13bm are connected in series with each other, and each one of the scan FF units 13b1 to 13bm includes scan FFs, the number of which corresponds to the bit number of the chip address of the corresponding one of the ising devices 2a1 to 2am.

For example, when the bit number of the chip address is p bits, the scan FF unit 13b1 includes scan FFs 41a1 to 41ap connected in series with each other, as illustrated in FIG. 5. The scan FF unit 13bm also includes scan FFs 42a1 to 42ap connected in series with each other.

For example, the scan FF units 13b1 to 13bm are arranged in the routers of the respective ising devices 2a1 to 2am.

From its terminal 44, the control device 3 sequentially outputs the bit values of the chip addresses set in the ising devices 2a1 to 2am one bit at a time. In addition, the control device 3 outputs a clock signal from its terminal 45. The clock signal is supplied to the scan FF units 13b1 to 13bm in a parallel manner. The bit values are transmitted to a downstream scan FF in synchronization with a rising edge (or a falling edge) of the clock signal.

After outputting the clock signal for m×p cycles, the control device 3 brings the logic level of a read enable signal outputted from its terminal 43 to an H (High) level, for example. As a result, the bit values are read from the scan FF units 13b1 to 13bm, and the chip addresses are stored in registers (not illustrated) arranged in the scan FF units 13b1 to 13bm, respectively.

For example, the initial values of the mode set values are stored in mode registers in the routers by using another scan chain (for example, in the mode register 13a in the router 13 in the case of the ising device 2ak in FIG. 1).

While the scan chain 40 forms a single path in FIG. 4, the present embodiment is not limited to this example.

Figure 6:
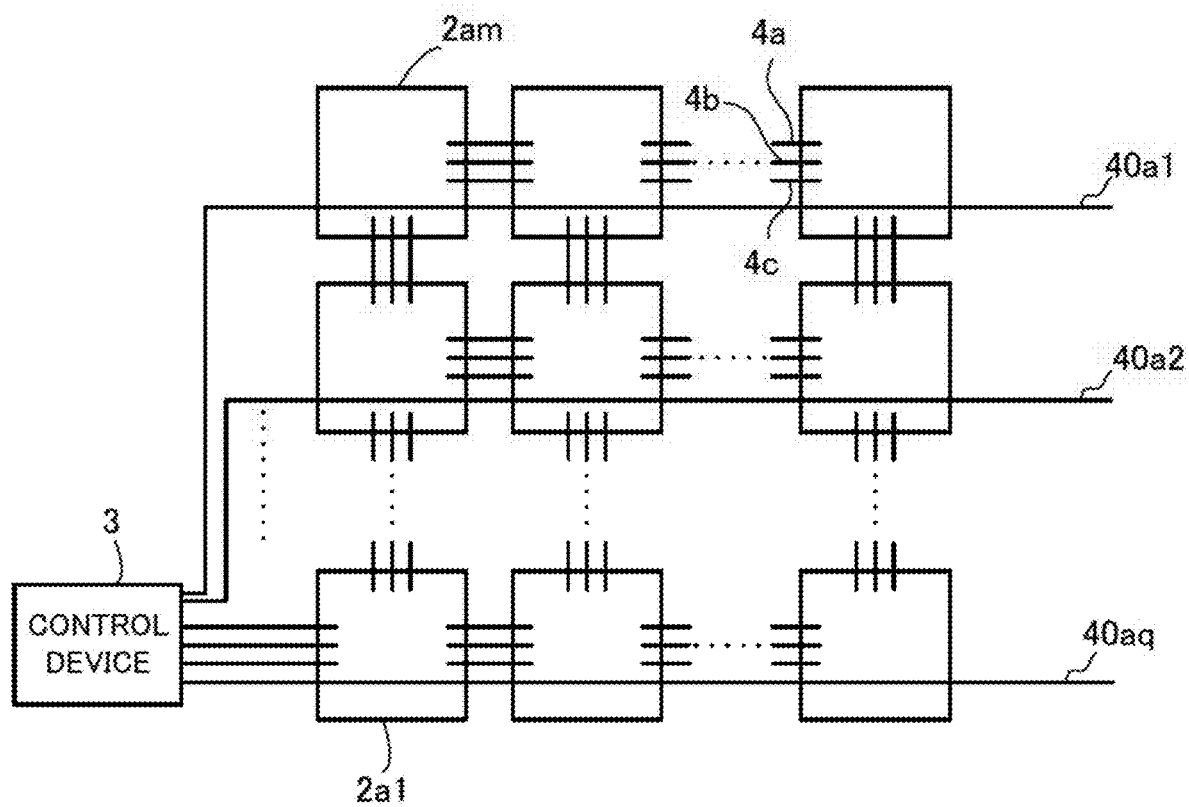
FIG. 6 illustrates another example of scan chains.

FIG. 6 illustrates another example of scan chains.

FIG. 6, q scan chains 40a1 to 40aq are connected to the control device 3 in a parallel manner. Among the ising devices 2a1 to 2am arranged in a matrix, those ising devices arranged in the same row are connected to the same scan chain.

By connecting the scan chains in a parallel manner, the initial values of the chip addresses and the mode set values are allocated to the ising devices 2a1 to 2am more quickly than when the scan chain 40 is used.

(Configuration Example of Router 13)

Figure 7:
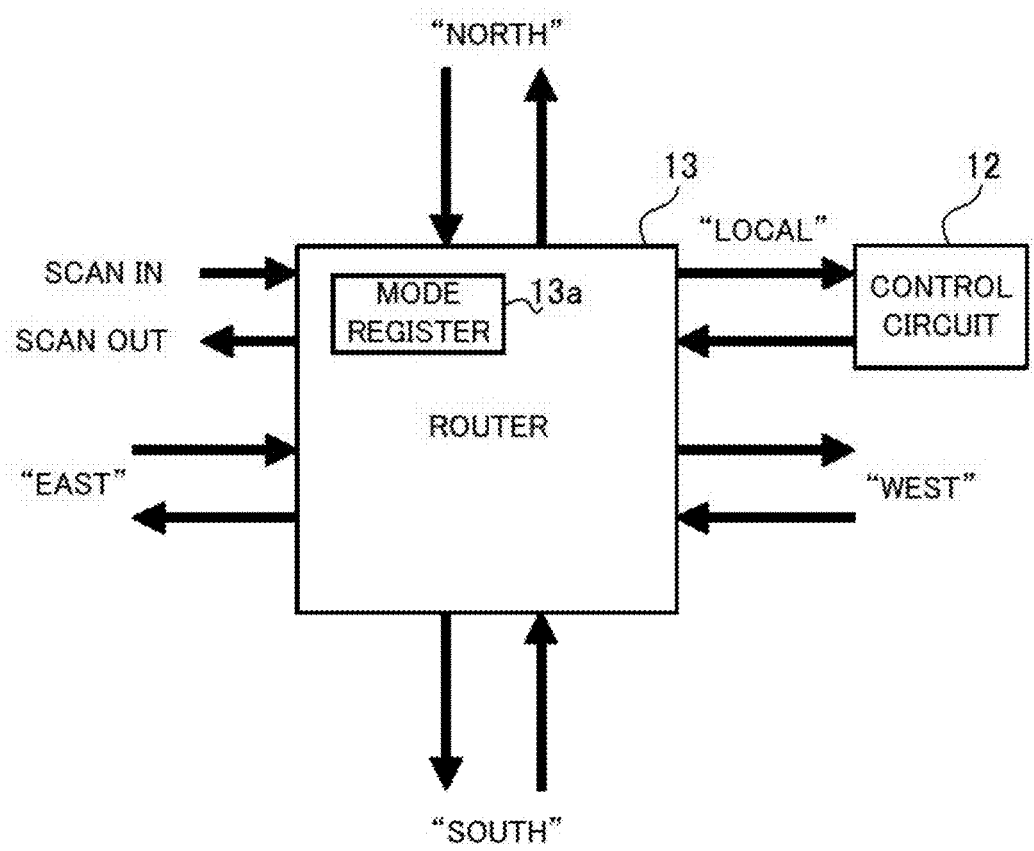
FIG. 7 illustrates an example of a router.

FIG. 7 illustrates an example of the router 13.

The router 13 includes five ports "NORTH", "SOUTH", "EAST", "WEST", and "LOCAL", other than a port used for scan-in and scan-out.

For example, when transferring information transmitted from a neighboring ising device on the left side of the ising device 2ak in FIG. 7 to a neighboring ising device on the right side in FIG. 7, the router 13 uses the two ports "EAST" and "WEST".

When transferring information transmitted from a neighboring ising device to the ising device 2ak to the control circuit 12 or when transferring information transmitted from the control circuit 12 to a neighboring ising device, the router 13 uses the port "LOCAL".

The router 13 also uses the port "LOCAL" when changing the mode set values stored in the mode register 13a.

Figure 8:
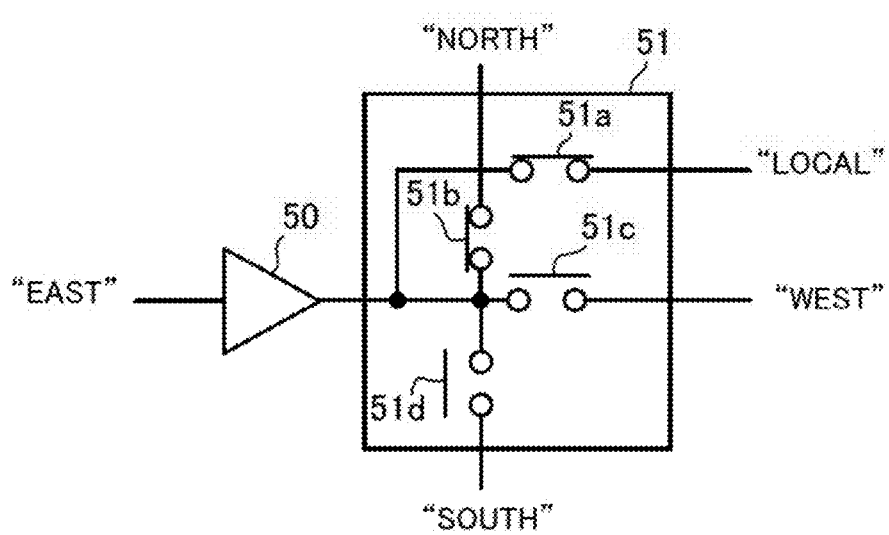
FIG. 8 illustrates an example of a switch unit connected to a port "EAST"

FIG. 8 illustrates an example of a switch unit 51 connected to the port "EAST".

Information supplied via the port "EAST" is supplied to the switch unit 51 via a buffer circuit 50.

The switch unit 51 includes switches 51a to 51d. The switch 51a is connected between the output terminal of the buffer circuit 50 and the port "LOCAL". The switch 51b is connected to the output terminal of the buffer circuit 50 and the port "NORTH". The switch 51c is connected to the output terminal of the buffer circuit 50 and the port "WEST". The switch 51d is connected to the output terminal of the buffer circuit 50 and the port "SOUTH".

For example, the switches 51a to 51d are n channel metal-oxide semiconductor field effect transistors (MOSFETs). In this case, for example, when a gate voltage generated by a switch control circuit not illustrated in the router 13 is brought to an H level, the switches 51a to 51d are set to an on-state. When the gate voltage is brought to an L (Low) level, the switches 51a to 51d are set to an off-state. The switch control circuit generates the gate voltage in accordance with the mode set values stored in the mode register 13a.

Figure 9:
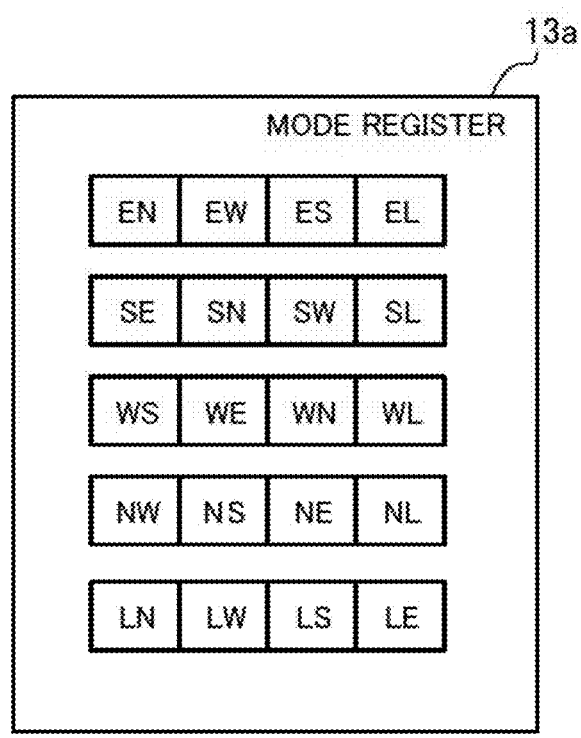
FIG. 9 illustrates an example of mode set values stored in a mode register.

FIG. 9 illustrates an example of the mode set values stored in the mode register 13a.

FIG. 9 illustrates an example of the mode set values for controlling switches in a switch unit connected to the five ports "NORTH", "SOUTH", "EAST", "WEST", and "LOCAL". In the example in FIG. 9, the mode set values are represented by a group of control codes each of which is expressed by a combination of initial letters of two of the ports "NORTH", "SOUTH", "EAST", "WEST", and "LOCAL".

For example, "EN" is a control code for controlling the switch 51b included in the switch unit 51 that is connected to the port "EAST" illustrated in FIG. 8 and that determines connection or disconnection between the ports "EAST" and "NORTH".

In addition, "WS" is a control code for controlling a switch included in a switch unit (not illustrated) that is connected to the "WEST" port and that determines connection or disconnection between the ports "WEST" and "SOUTH".

An individual control code is represented by, for example, 0 or 1. When a control code is 0, the switch controlled by this control code is set to an off-state. When the control code is 1, the switch controlled by this control code is set to an on-state.

For example, when (EN, EW, ES, EL)=(1, 0, 0, 1), the switches 51a and 51b in the switch unit 51 illustrated in FIG. 8 are set to an on-state while the switches 51c and 51d are set to an off-state.

Figure 10:
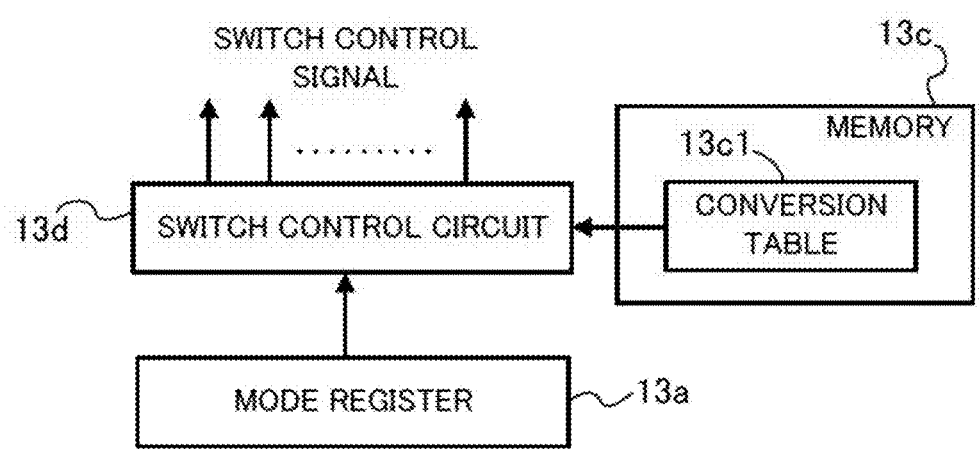
FIG. 10 illustrates another example of switch control.

FIG. 10 illustrates another example of switch control.

For example, instead of holding the above control codes as the mode set values, the mode register 13a may hold identification information indicating mode names.

In addition, a memory 13c in the router 13 holds a conversion table 13c1 indicating a relationship between the above identification information and control codes.

A switch control circuit 13d in the router 13 refers to the conversion table 13c1 stored in the memory 13c in the router 13 and determines the control codes from the above identification information. The switch control circuit 13d outputs a switch control signal based on the control codes and controls the switches 51a to 51d, etc.

In this way, the number of bits of the mode set values stored in the mode register 13a is reduced, and the bandwidth needed to transfer the mode set values is reduced.

Figure 11:
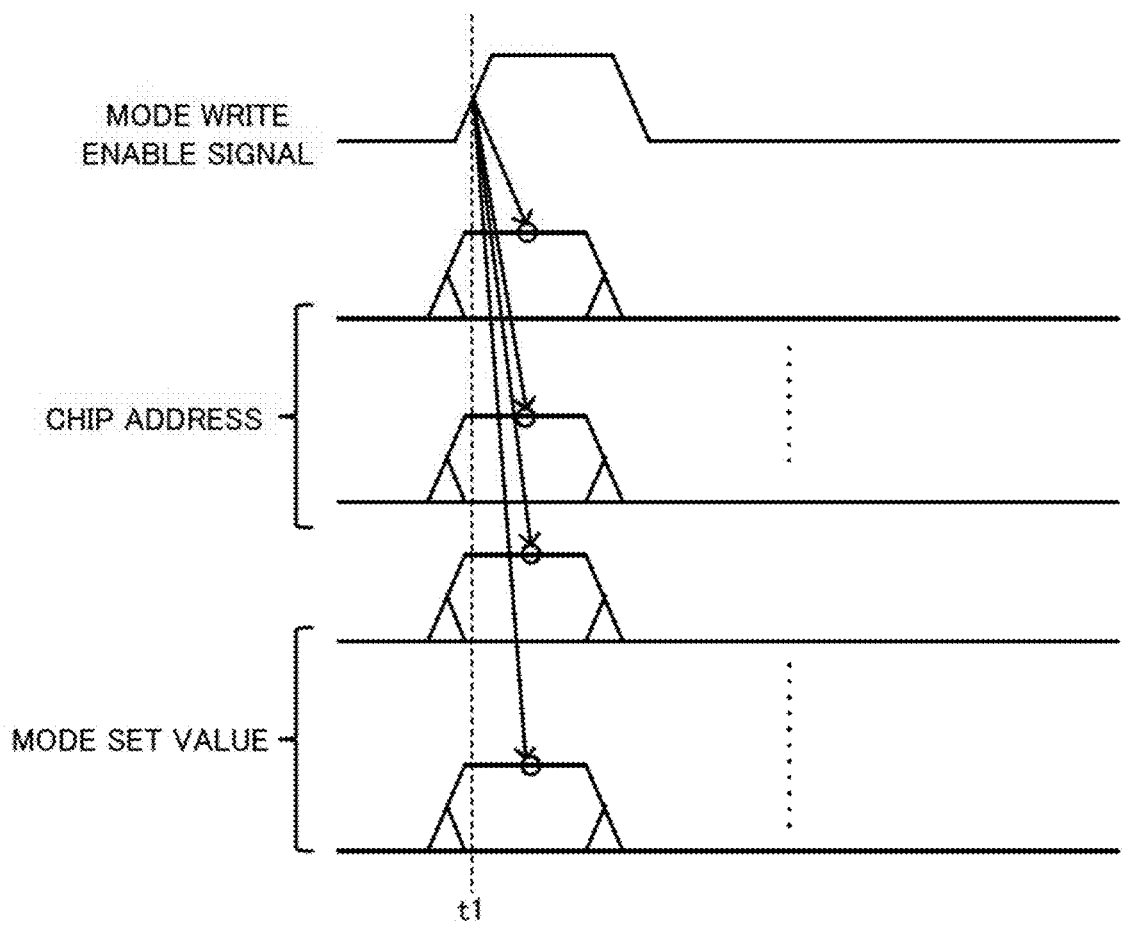
FIG. 11 is a timing chart illustrating an example of a mode set value change method.

FIG. 11 is a timing chart illustrating an example of a mode set value change method.

When changing the mode set values stored in the mode register 13a in the router 13 in the ising device 2ak, the control device 3 transmits the chip address of the ising device 2ak and mode set values via the buses 4b and 4c. In addition, the control device 3 sets the logic level of a mode write enable signal transmitted via a control signal line not illustrated to an H level.

In response, the router 13 receives the mode write enable signal from one of the four ports "NORTH", "SOUTH", "EAST", and "WEST" in accordance with the current mode set values. Next, in synchronization with a rising edge of the mode write enable signal (at timing t1), the router 13 compares its own chip address with the chip address supplied from the port that has received the mode write enable signal.

If both the chip addresses match, the router 13 captures the mode set values from the port and updates the mode set values stored in the mode register 13a via the port "LOCAL".

(Function of Reproducing Waveforms and Timing)

In the information processing apparatus 1 according to the present embodiment, signal transmission is performed within a chip and between chips. To reduce deformation of a signal waveform, for example, the following group of circuits is connected to the router 13.

Figure 12:
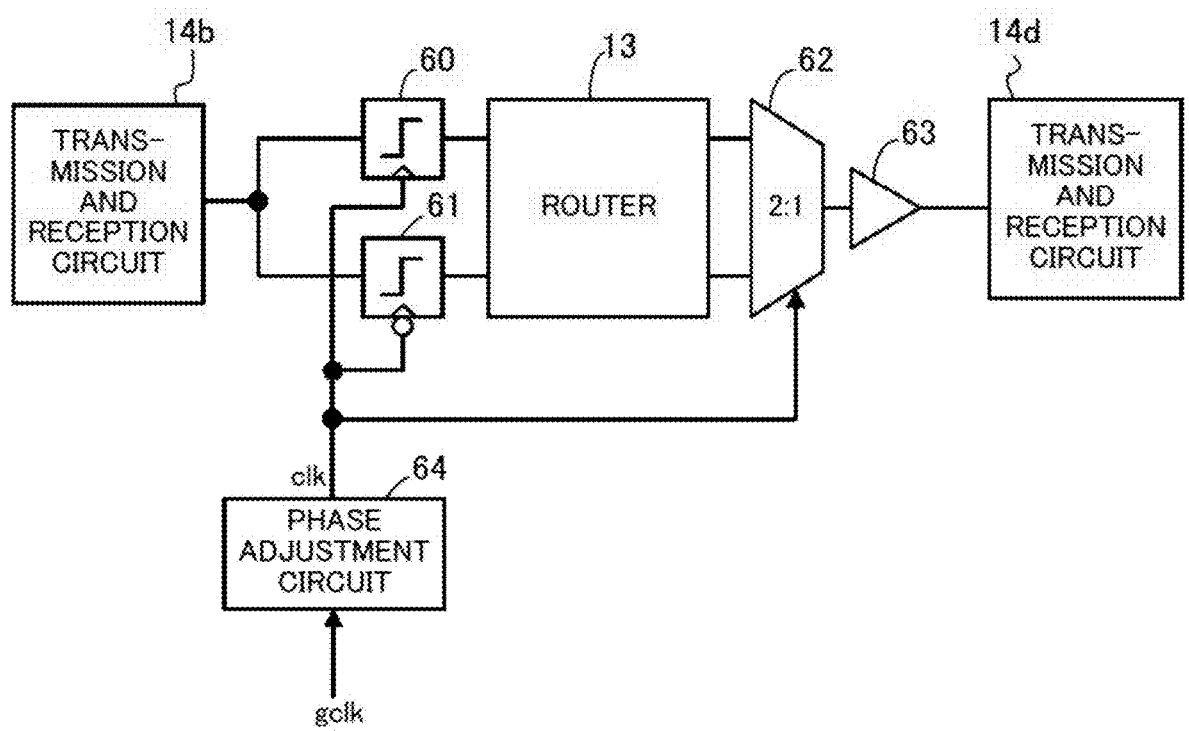
FIG. 12 illustrates an example of a router to which a group of circuits that reproduce waveforms and timing is connected.

FIG. 12 illustrates an example of the router 13 to which a group of circuits that reproduce waveforms and timing is connected In the example in FIG. 12, the transmission and reception circuit 14b receives a signal and transmits this signal to the transmission and reception circuit 14d via the router 13, and the transmission and reception circuit 14d transmits this signal. However, the same circuit group is arranged for the signal transmission in a different direction.

Flip flops 60 and 61 connected in parallel with each other are arranged between the transmission and reception circuit 14b and the router 13. In addition, a 2:1 multiplexer 62 and a buffer circuit 63 are arranged between the router 13 and the transmission and reception circuit 14d.

For example, in synchronization with a rising edge of a clock signal clk outputted by a phase adjustment circuit 64, the flip flop 60 captures the value of the signal supplied by the transmission and reception circuit 14b and outputs the value to the router 13. For example, in synchronization with a falling edge of the clock signal clk outputted by the phase adjustment circuit 64, the flip flop 61 captures the value of the signal supplied by the transmission and reception circuit 14b and outputs the value of the router 13.

The 2:1 multiplexer 62 receives the two signals outputted by the flip flops 60 and 61 via the router 13 and outputs one of the signals, depending on the logic level (H or L level) of the clock signal clk. The output signal of the 2:1 multiplexer 62 is supplied to the transmission and reception circuit 14d via the buffer circuit 63.

For example, the phase adjustment circuit 64 receives a global clock signal gclk from the control device 3. Next, the phase adjustment circuit 64 outputs the clock signal clk obtained by adjusting the phase of the global clock signal gclk so that the flip flops 60 and can capture the signal outputted by the transmission and reception circuit 14b at the middle of the eye pattern of the signal.

Figure 13:
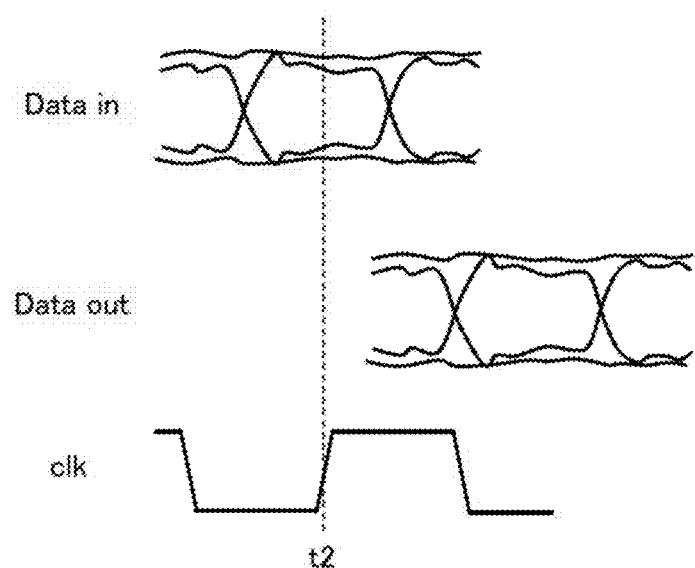
FIG. 13 illustrates how a waveform and timing are reproduced.

FIG. 13 illustrates how a waveform and timing are reproduced.

The phase of the clock signal clk has been adjusted so that a rising edge at timing t2 corresponds to about the middle of the eye pattern of a signal (Data in) supplied by the transmission and reception circuit 14b.

The buffer circuit 63 outputs a signal (Data out) that lags the Data in by a predetermined time. By connecting the above circuit group to the router 13, the Data out having approximately the same waveform as that of the Data in is obtained.

(Multi-Drop Bus Function)

Figure 14:
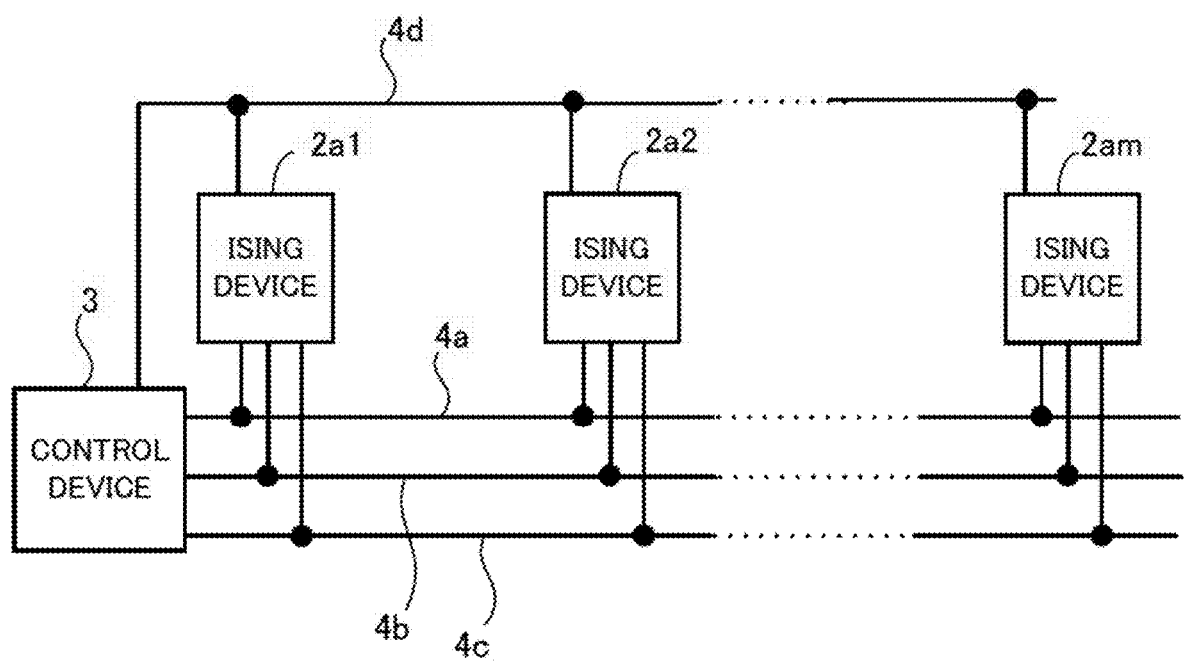
FIG. 14 illustrates a multi-drop bus function.

FIG. 14 illustrates a multi-drop bus function.

In the information processing apparatus 1 according to the present embodiment, the buses 4a to 4c function as a multi-drop bus capable of exchanging signals among the connected ising devices 2a1 to 2am as illustrated in FIG. 14. For example, when the logic level of the mode write enable signal transmitted through a control signal line 4d for delivering control signals is set to an H level, an ising device whose chip address matches the chip address transmitted through the bus 4b captures the mode set values transmitted through the bus 4c.

(Example of Connection Destination Information 11a Stored in Memory 11)

Figure 15:
FIG. 15 illustrates an example of connection destination information.

FIG. 15 illustrates an example of connection destination information.

FIG. 15 illustrates an example of connection destination information 70 associated with the neuron circuit 10ai illustrated in FIG. 2 among the neuron circuits 10a1 to 10an in the ising device 2ak.

In the connection destination information 70, internal addresses that identify the connection destination neuron circuits, respectively, connected to the neuron circuit 10ai, chip addresses that identify the ising devices including the connection destination neuron circuits, respectively, and weight value identification information are associated with each other.

For example, the first row in the connection destination information 70 indicates that the neuron circuit 10*ai* is connected to a neuron circuit whose internal address is 1 in an ising device whose chip address is 0. In addition, the first row indicates that the weight value identification information indicating connection between this neuron circuit and the neuron circuit 10*ai* is (i, n+1), in which n is the number of neuron circuits 10*a*1 to 10*an* in the ising device 2*ak*. When n=1,024, the identification information is (i, 1025).

In addition, in the connection destination information 70, n1 is the number of neuron circuits connected to the neuron circuit 10*ai* in the ising device whose chip address is 0. In addition, n2 is the number of neuron circuits connected to the neuron circuit 10*ai* in the ising device whose chip address is 2.

When the number of ising devices 2*a*1 to 2*am* is 1,024, the chip address is expressed by 10 bits, for example.

These items of correspondence information among the weight value identification information, the chip addresses, and the internal addresses are listed in the ascending order of the weight value identification information.

The connection destination information associated with the neuron circuits other than the neuron circuit 10*ai* of all the neuron circuits 10*a*1 to 10*an* in the ising device 2*ak* is configured in the same way.

(Example of Annealing Operation)

Hereinafter, an example of an operation (an annealing operation) of the information processing apparatus 1 controlled by the control device 3 will be described.

Figure 16:
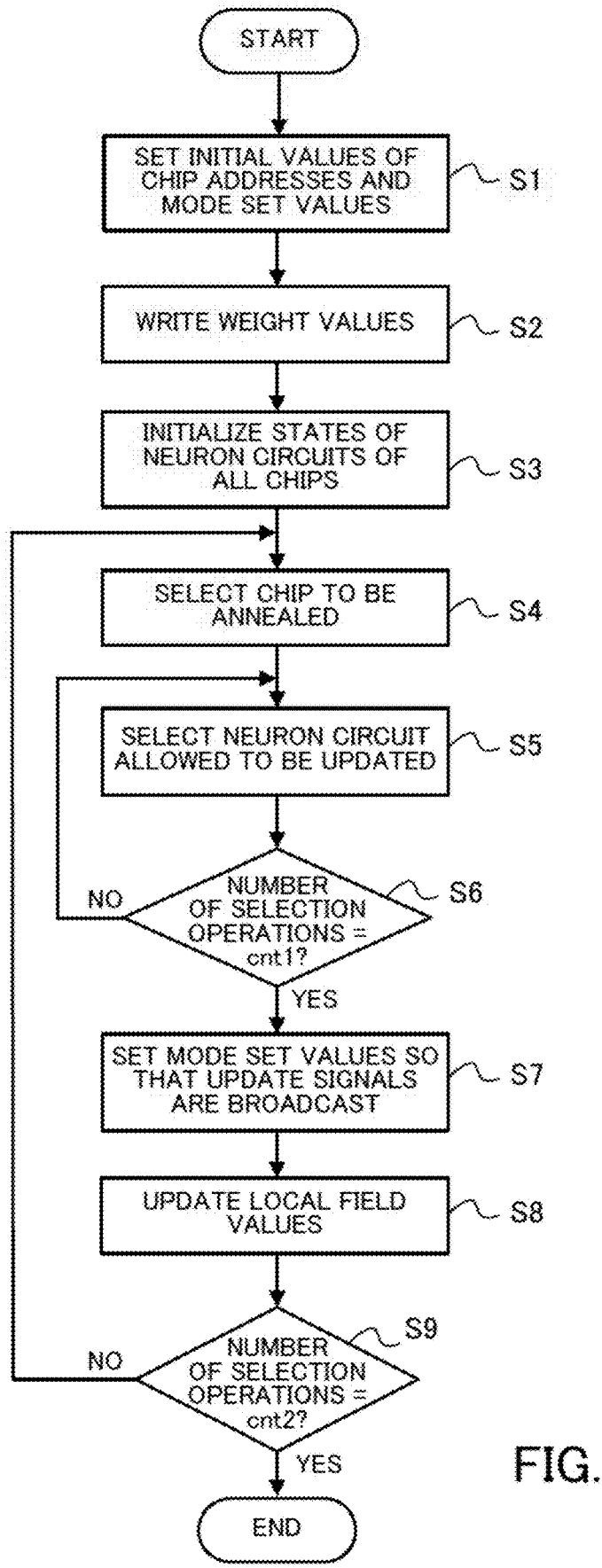
FIG. 16 is a flowchart illustrating an example of an operation of the information processing apparatus.

FIG. 16 is a flowchart illustrating an example of an operation of the information processing apparatus 1.

First, for example, by using the scan chain 40 as illustrated in FIG. 4 or the scan chains 40*a*1 to 40*aq* as illustrated in FIG. 6, the control device 3 sets initial values of the chip addresses and the mode set values in registers in the ising devices 2*a*1 to 2*am* (step S1). For example, in the case of the ising device 2*ak*, the control device 3 sets the initial values of the mode set values in the mode register 13*a* and sets the chip address in a register not illustrated in the router 13.

Next, the control device 3 writes (sets) weight values in accordance with the problem to be calculated in registers (or memories) in the neuron circuits in the ising devices 2*a*1 to 2*am* (step S2).

Figure 17:
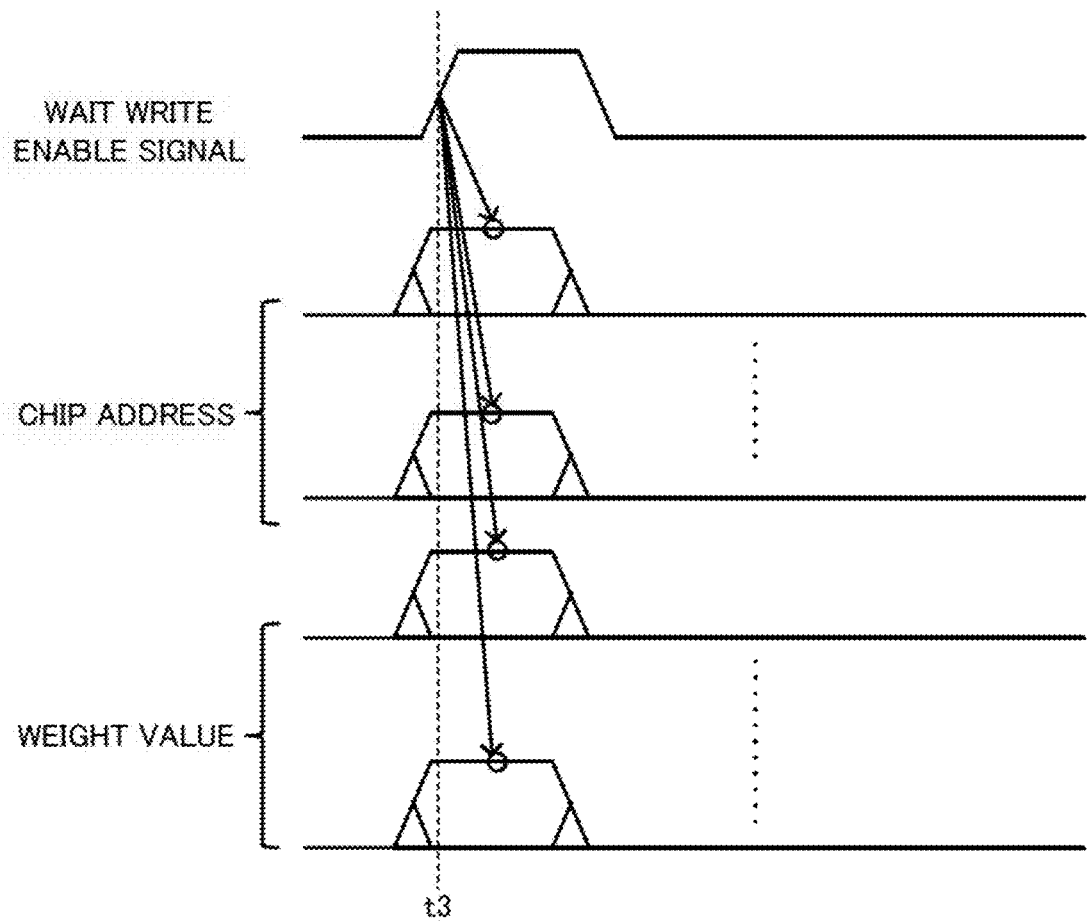
FIG. 17 is a timing chart illustrating an operation example performed when weight values are written.

FIG. 17 is a timing chart illustrating an operation example performed when the weight values are written.

When writing weight values in the registers 20*a*1 to 20*an* in the neuron circuits 10*a*1 to 10*an* in the ising device 2*ak*, the control device 3 transmits the chip address of the ising device 2*ak* and the weight values through the buses 4*a* and 4*b*. For example, the control device 3 sets the logic level of a wait write enable signal to be transmitted through the control signal line 4*d* as illustrated in FIG. 14 to an H level.

In accordance with the current mode set values, the router 13 receives the wait write enable signal from one of the four ports "NORTH", "SOUTH", "EAST", and "WEST". Next, in synchronization with a rising edge of the mode write enable signal (at timing t3), the router 13 compares the chip address supplied from the port that has received the mode write enable signal with the chip address of the corresponding ising device.

Next, when both the chip addresses match, the router 13 captures the weight values from the above port and writes the weight values in the registers 20*a*1 to 20*an* via the port "LOCAL".

The control device 3 writes weight values in the same way in registers (or memories) in the neuron circuits in the other ising devices.

Next, the control device 3 initializes the states of the neuron circuits in all the chips (the ising devices 2*a*1 to 2*an*) (step S3). For example, the control device 3 resets the values in the registers holding the local field values of the neuron circuits via a control signal line not illustrated.

Next, among the ising devices 2*a*1 to 2*an*, the control device 3 selects a single ising device (a chip to be annealed) that is operated to perform an annealing operation (step S4). For example, the control device 3 randomly selects one of the ising devices 2*a*1 to 2*an*. Next, by transmitting a control signal, the control device 3 disables the comparator circuits in the neuron circuits in the ising devices other than the selected ising device, the comparator circuits determining output signal values, so that the output signal values will not change.

In the selected ising device, a single neuron circuit whose state is allowed to be updated is randomly selected (step S5). The following description will be made assuming that the ising device 2*ak* has been selected in step S4. In this case, the random signal generation circuit 15 allows updating one of the states of the neuron circuits 10*a*1 to 10*an*.

For example, when updating of the state $x_i$ of the neuron circuit 10*ai* is allowed, if a value obtained by adding a noise value to the local field value $h_i$ exceeds a threshold, the state $x_i$ is set to 1. When the original value of the state $x_i$ is 0, the XOR 28*i* outputs 1 and notifies the control circuit 12 that the state $x_i$ has been updated.

When notified that the state $x_i$ has been updated, the control circuit 12 supplies a selection signal for causing the other neuron circuits in the ising device 2*ak* to select a weight value that represents connection strength with the neuron circuit 10*ai* and the value of the updated state $x_i$.

When the number of operations of selecting a neuron circuit whose state is allowed to be updated is below a predetermined number cnt1 (step S6: NO), the processing returns to step S5.

Each time the control device 3 selects a neuron circuit whose state is allowed to be updated, for example, the control device 3 causes the noise generation circuit 14 to gradually drop the amplitude of the noise. In this way, simulated annealing is performed.

Figure 18:
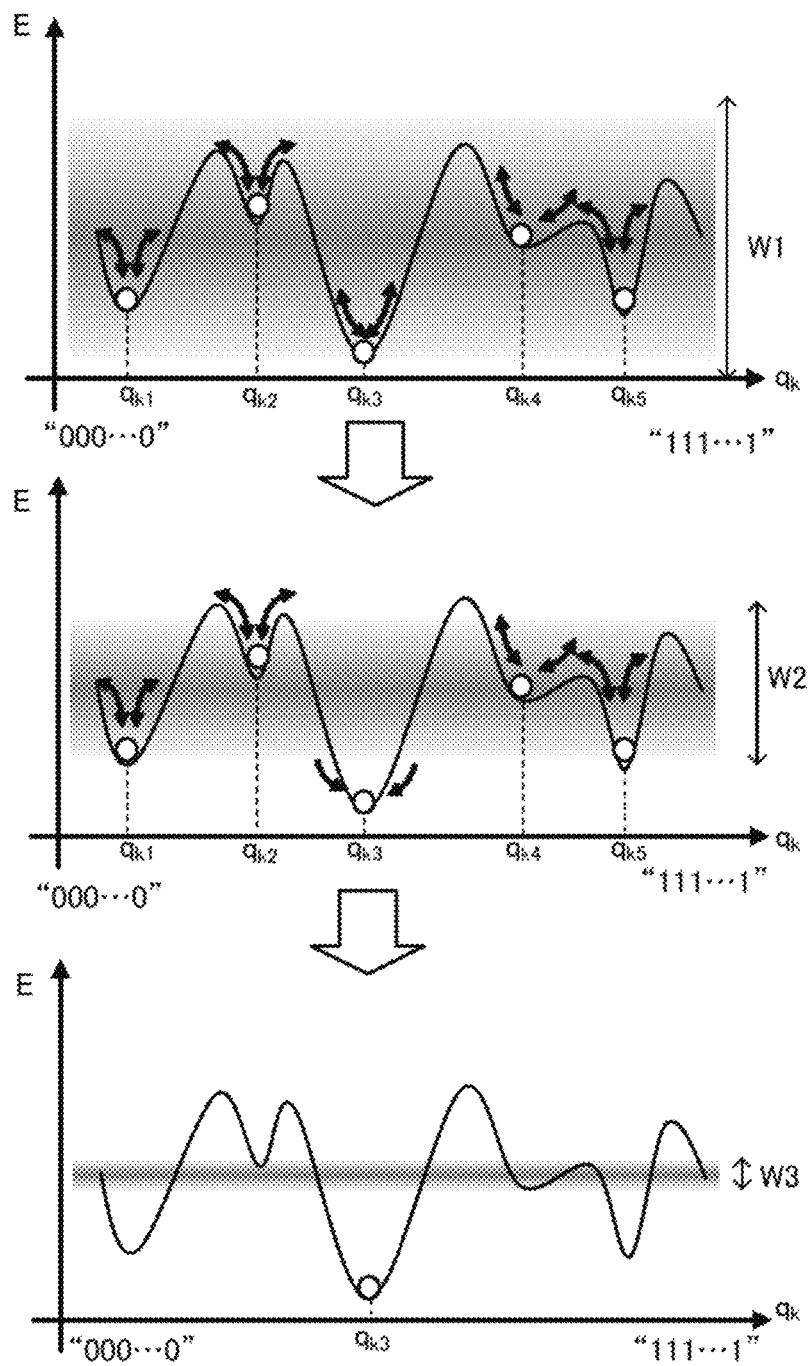
FIG. 18 illustrates progress of simulated annealing.

FIG. 18 illustrates progress of simulated annealing.

The vertical axis represents energy E, and the horizontal axis represents combinations $q_K$ of states of all the neuron circuits. The combinations $q_K$ are represented by "000 . . . 0" to "111 . . . 1". FIG. 18 illustrates how the convergence into an optimal solution is achieved as the noise amplitude is dropped from W1 to W3. Dropping the noise amplitude means dropping the effective temperature T in expression (5).

When the noise amplitude is W1, even when an individual solution reaches a local solution $q_{k1}$, $q_{k2}$, $q_{k4}$, or $q_{k5}$ (a solution when the energy represents a local minimal value), the local solution can change in the direction of higher energy. Thus, these solutions can shift from the local solutions. As the noise amplitude gradually drops to W2 and W3, the change of the individual solution is also gradually limited, and the convergence into an optimal solution $q_{k3}$ (a solution when the energy represents a minimum value) is finally achieved.

In simulated annealing, since it takes time to achieve the convergence into an optimal solution, the number of operations of selecting a neuron circuit whose state is allowed to be updated is limited to the number cnt1. To obtain a solution having smaller energy, a quantum Monte Carlo method may be used, for example.

In the processing illustrated in FIG. 16, when the number of selection operations reaches the number cnt1 (step S6: YES), the control circuit 12 notifies the router 13 of the internal address of the neuron circuit whose state has changed before and after the selection corresponding to the number cnt1 and a value corresponding to the changed state.

The router 13 broadcasts the internal address and an update signal including the value corresponding to the changed state by using the buses 4a and 4b, for example. When the number of neuron circuits 10a1 to 10an is n=1,024, the router 13 broadcasts up to 1,024 update signals. For example, the router 13 broadcasts the update signals in the ascending order of the internal addresses of the neuron circuits.

In this operation, the control device 3 sets the mode set values in accordance with the above method so that the update signals are broadcast to the ising devices 2a1 to 2am (except the ising device 2ak) (step S7).

When an ising device receives the update signal and determines that the state of a connection destination neuron circuit connected to a neuron circuit included in the ising device has changed, the ising device updates the local field value of the neuron circuit (step S8).

Figure 19:
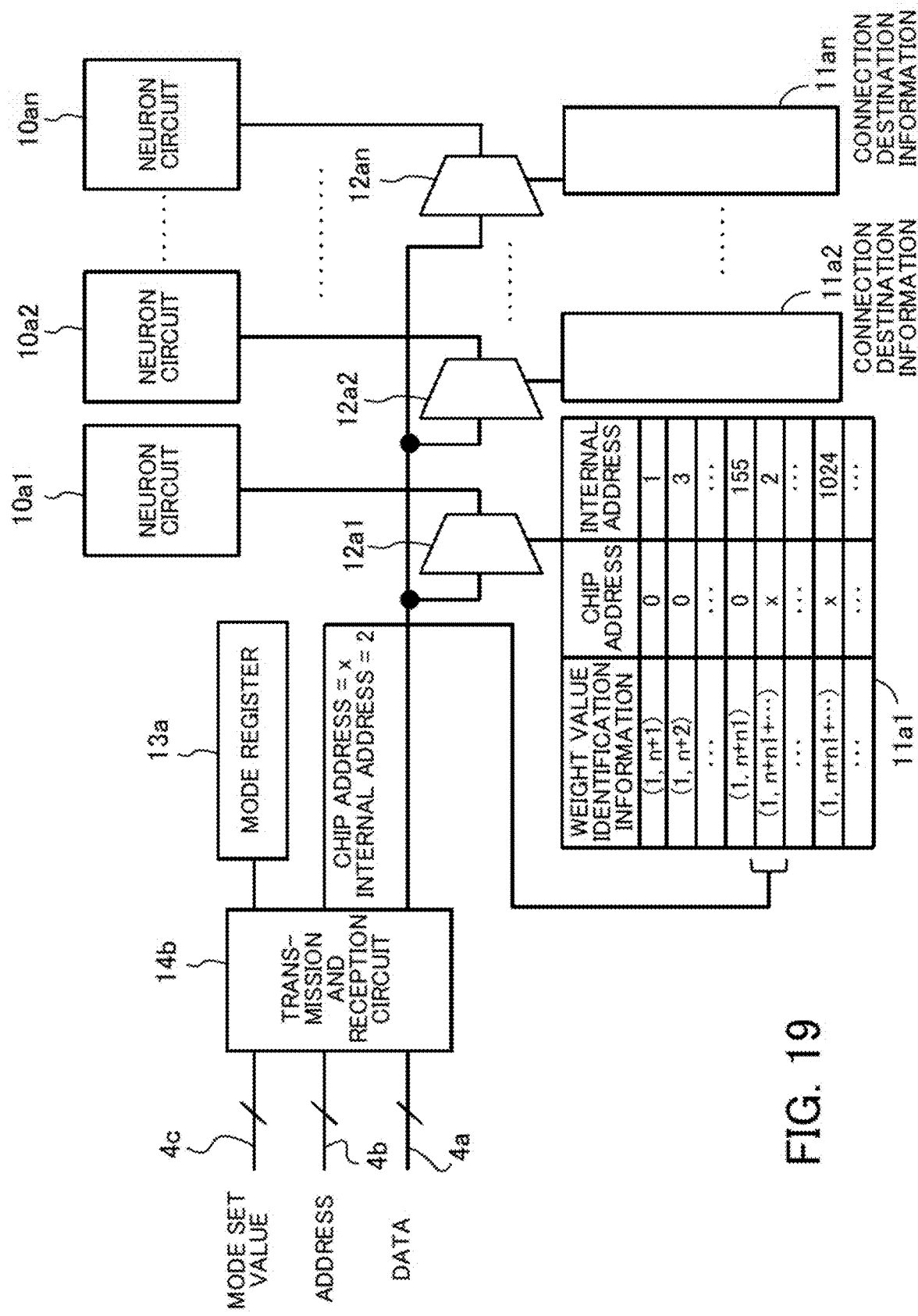
FIG. 19 illustrates an example of an operation of an ising device that receives an update signal.

FIG. 19 illustrates an example of an operation of an ising device that receives an update signal.

FIG. 19 will be described by using the ising device 2ak illustrated in FIG. 1 as an example. The illustration of the router 13, etc. is omitted in FIG. 19.

Selection circuits 12a1 to 12an are included in the control circuit 12 illustrated in FIG. 1. The control circuit 12 receives the internal address of a neuron circuit whose state has changed of all the neuron circuits included in a chip to be annealed and a value corresponding to the changed state as an update signal via the buses 4a and 4b and the transmission and reception circuit 14b.

For example, when x is supplied as the chip address of the chip to be annealed via the bus 4b, if the control circuit 12 receives internal address 2 as an update signal, the control circuit 12 refers to connection destination information 11a1 to 11an. In the connection destination information 11a1 to 11an, the internal addresses of the connection destination neuron circuits of the neuron circuits 10a1 to 10an, the chip addresses of the ising device including the connection destination neuron circuits, and weight value identification information are associated with each other.

As illustrated in FIG. 19, when the chip address is x, internal address 2 is included in the connection destination information 11a1. In this case, the selection circuit 12a1 supplies the value of the changed state of the neuron circuit received as an update signal to the neuron circuit 10a1.

While not illustrated, a selection signal for selecting a weight value is also supplied to the neuron circuit 10a1 in accordance with the weight value identification information corresponding to chip address x and internal address 2 in the connection destination information 11a1.

The neuron circuit 10a1 updates the local field value in accordance with the selection signal and the value of the updated state.

Next, when the number of operations of selecting a chip to be annealed is less than a predetermined number cnt2 (step S9: NO), the processing returns to step S4.

When the number of operations of selecting a chip to be annealed reaches the number cnt2 (step S9: YES), the control device 3 ends the annealing operation.

The order of the above steps is not limited to the above example. For example, the control device 3 may set mode set values after step S4.

In addition, while the router 13 broadcasts the update signals when the number of selection operations reaches the number cnt1 in the above example, the router may broadcast the update signals each time a neuron circuit is selected.

The control device 3 obtains a solution to the problem by reading the states of all the neuron circuits after the above processing. For example, by using a scan chain, the control device 3 reads the states of all the neuron circuits.

For example, the read states are displayed by a display device (not illustrated) connected to the control device 3.

With the information processing apparatus 1, each of the ising devices 2a1 to 2am having a plurality of neuron circuits includes a memory holding connection destination information including the addresses of connection destination neuron circuits and the addresses of the ising devices including the connection destination neuron circuits and a router capable of changing the connection destinations. In addition, each of the ising devices 2a1 to 2am reflects neuron states of other ising devices obtained via the corresponding router on its own neuron circuits in accordance with the connection destination information. In this way, the inter-neuron-circuit connection number is increased, and a large-scale operation is performed.

For example, while it is difficult to cause integrated circuits on a single chip to calculate an optimization problem in which $10^3$ to $10^6$ or more variables are used, since the information processing apparatus 1 functions as a single ising device by using many chips, the information processing apparatus 1 is able to perform such a calculation easily.

Figure 20:
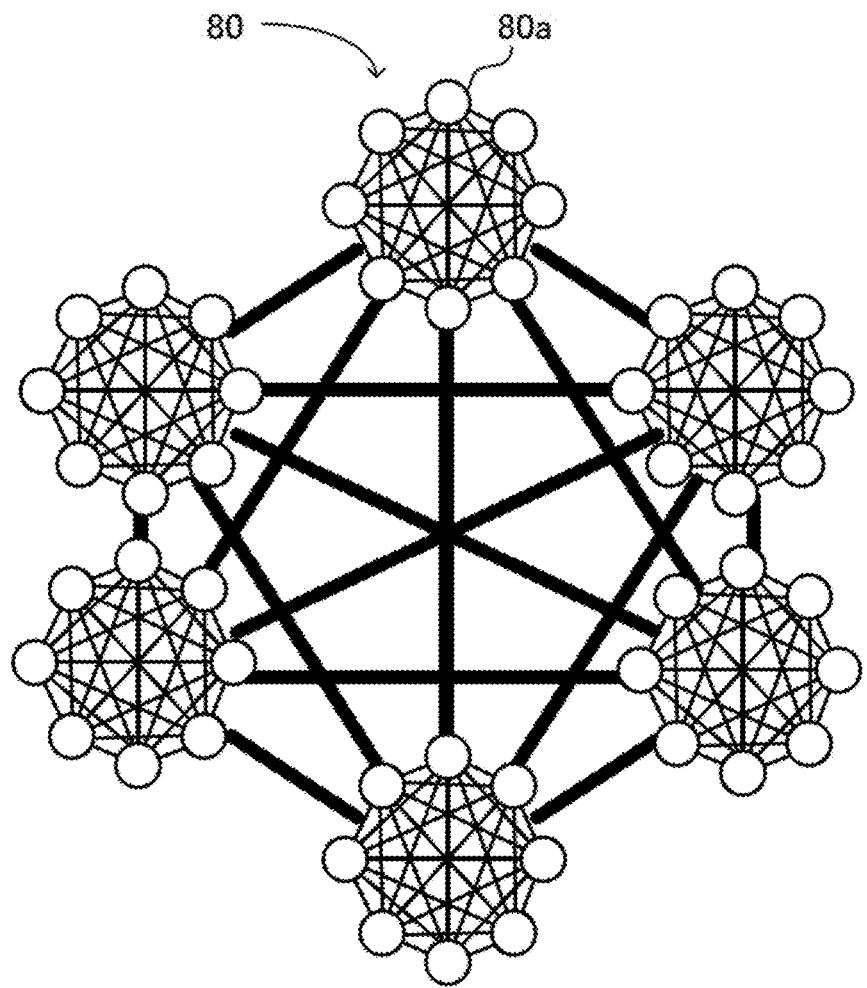
FIG. 20 is a conceptual diagram of a neural network realized by the information processing apparatus according to the first embodiment.

FIG. 20 is a conceptual diagram of a neural network realized by the information processing apparatus according to the present embodiment.

In the example in FIG. 20, a neural network is illustrated in which six neuron units (for example, neuron units 80) are interconnected. In each of the neuron units, eight neurons (for example, neurons 80a) are connected to with each other.

A single neuron unit corresponds to a single ising device (a chip), and a single neuron corresponds to a single neuron circuit.

While the number of connections among the neuron units could be a constraint when a problem mapping is performed (setting of the weight values=programming), in many cases programming is possible without problem if the number of connections among the neuron units is about 1/10 of the number of connections among the neuron units.

Second Embodiment

Figure 21:
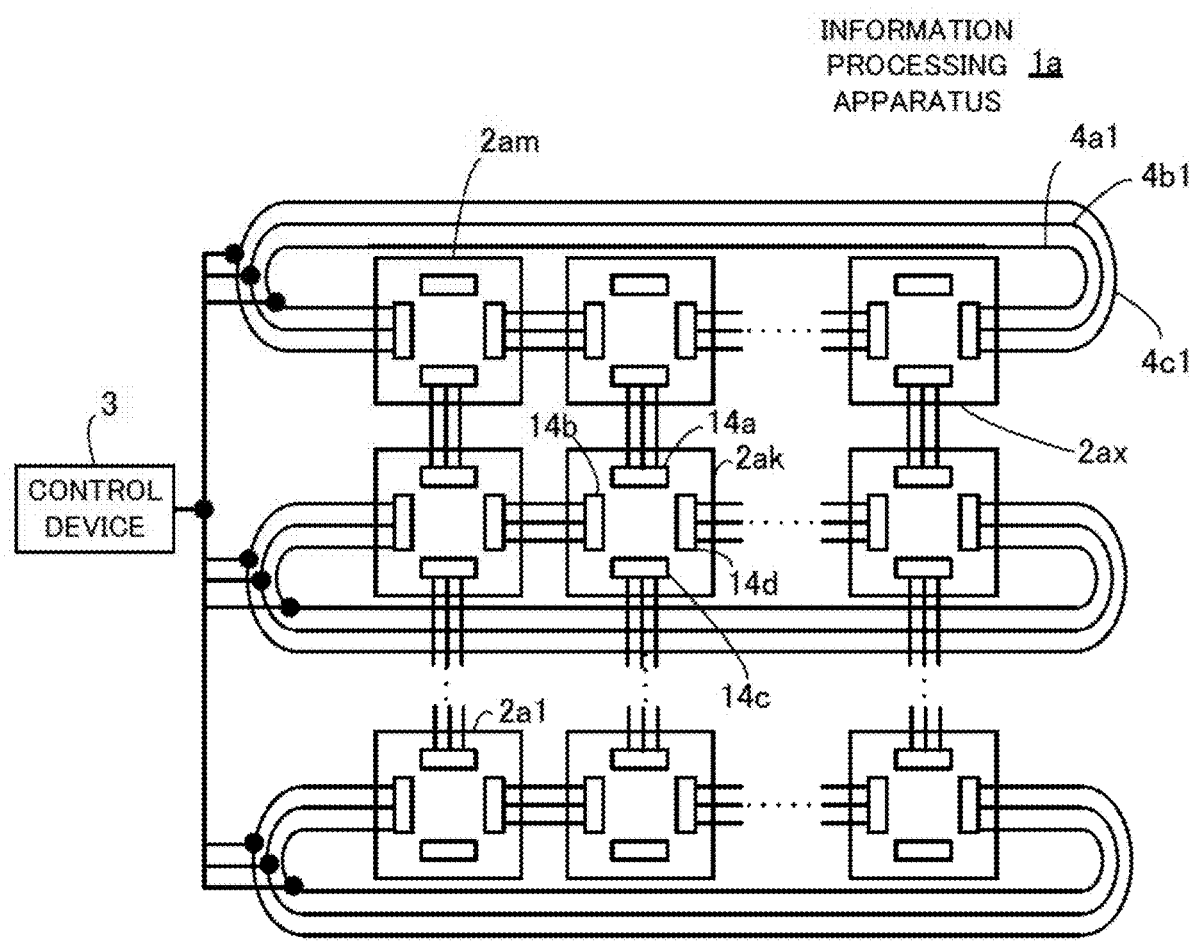
FIG. 21 illustrates an example of an information processing apparatus according to a second embodiment.

FIG. 21 illustrates an example of an information processing apparatus 1a according to a second embodiment. Like reference characters refer to like elements in FIGS. 1 and 21.

The connection topology of the ising devices (chips) of the information processing apparatus 1a according to the second embodiment differs from that of the information processing apparatus 1 in FIG. 1.

The connection topology of the chips of the information processing apparatus 1a is a one-dimensional (1D) torus. While the ising devices 2a1 to 2am are arranged in a matrix, among the plurality of ising devices arranged in a row, the ising devices arranged at both ends of the row are connected to each other via buses.

For example, as illustrated in FIG. 21, among the plurality of ising devices arranged in the first row, ising devices 2ax and 2am at both ends are connected to each other via buses 4a1 to 4c1.

By using such a connection topology, the transmission and reception circuits of the ising devices around the periphery of the array of the ising devices 2a1 to 2am arranged in a matrix are used more. Thus, decrease in the bandwidth and the connection number is reduced.

As another example of the 1D torus, among the plurality of ising devices arranged in a column, the ising devices arranged at both ends of the column may be connected to each other via buses.

Third Embodiment

Figure 22:
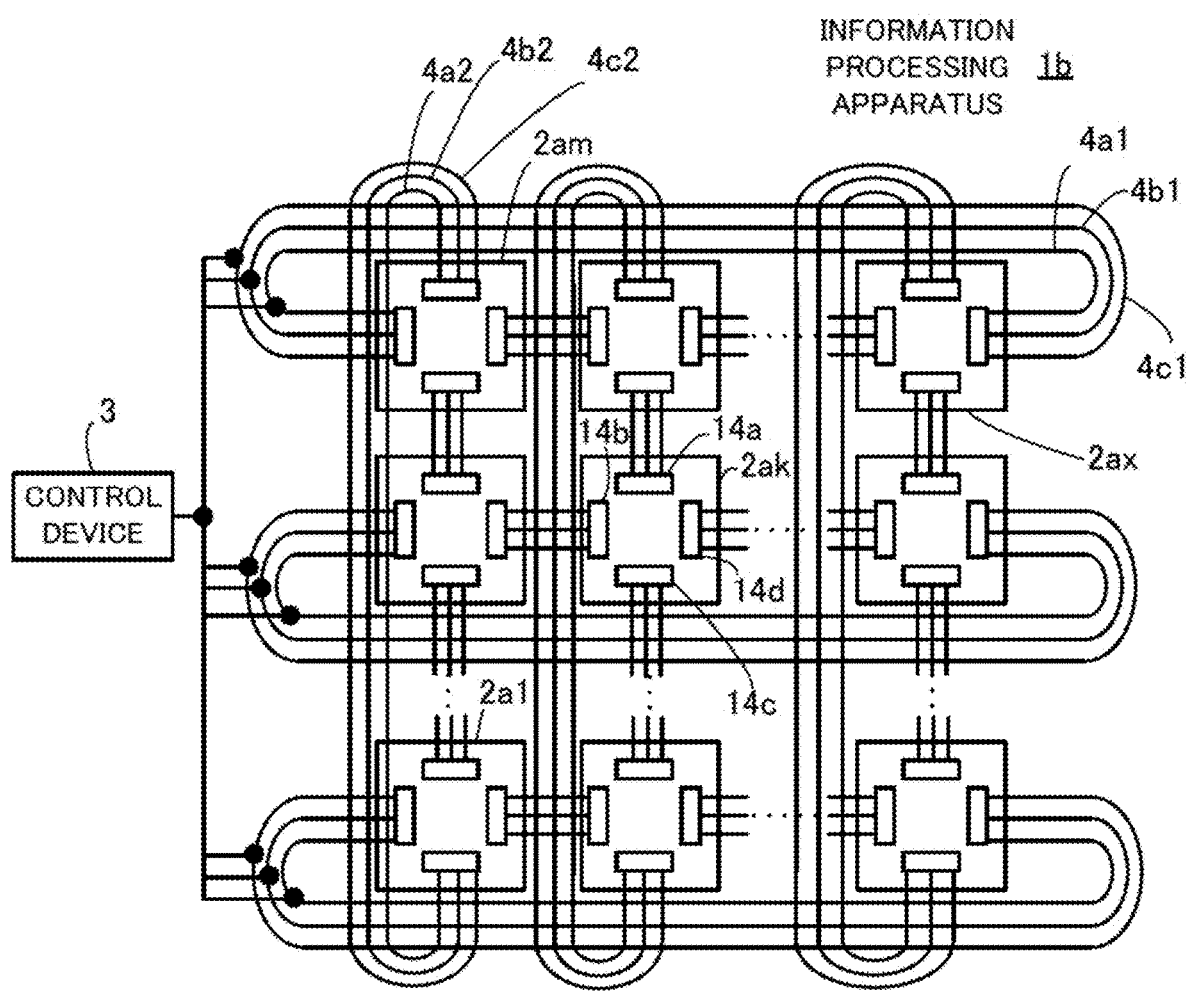
FIG. 22 illustrates an example of an information processing apparatus according to a third embodiment.

FIG. 22 illustrates an example of an information processing apparatus 1b according to a third embodiment. Like reference characters refer to like elements in FIGS. 21 and 22.

The connection topology of the ising devices (chips) of the information processing apparatus 1b according to the third embodiment differs from that of the information processing apparatus 1a illustrated in FIG. 21.

The connection topology of the chips of the information processing apparatus 1b is a two-dimensional (2D) torus. While ising devices 2a1 to 2am are arranged in a matrix, among the plurality of ising devices arranged in a row, the ising devices arranged at both ends of the row are connected to each other via buses. In addition, among the plurality of ising devices arranged in a column, the ising devices arranged at both ends of the column are also connected to each other via buses.

For example, as illustrated in FIG. 22, among the plurality of ising devices arranged in the first column, ising devices 2a1 and 2am at both ends of the column are connected to each other via buses 4a2 to 4c2.

By using such a connection topology, the transmission and reception circuits of the ising devices around the periphery of the array of the ising devices 2a1 to 2am arranged in a matrix are used more. Thus, decrease in the bandwidth and the connection number is further reduced.

(Faster Calculation Method)

As described above, in simulated annealing, since it takes time to obtain an optimal solution, it is desirable that the following faster calculation method be used.

Figure 23:
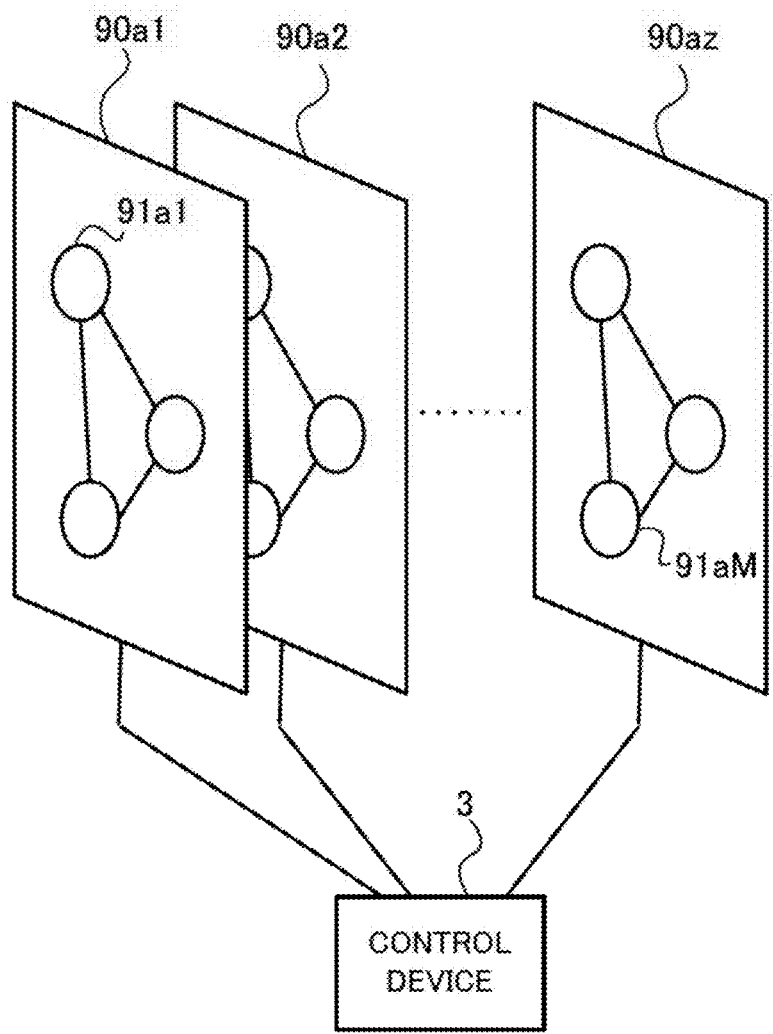
FIG. 23 illustrates a faster calculation method using parallelization.

FIG. 23 illustrates a method of faster calculation method using parallelization.

For example, the control device 3 divides all neuron circuits 91a1 to 91aM into a plurality of ensembles 90a1 to 90az with which the same problem is mapped. The ensembles 90a1 to 90az have the same connection relationship about a plurality of neuron circuits included therein (corresponding to setting of the weight values). In addition, the control device 3 sets weight values so that a neuron circuit belonging to one ensemble is not connected to any of the other neuron circuits belonging to any of the other ensembles.

The control device 3 performs annealing operations in a parallel manner by using each of the ensembles 90a1 to 90az. The same temperature (noise width) is used among the ensembles 90a1 to 90az.

Next, the control device 3 compares the energy values of the ensembles 90a1 to 90az obtained after the annealing operations and selects a combination of states of neuron circuits included in an ensemble having a minimum energy as a solution to the problem.

In this way, by solving the same problem in a parallel manner by using the plurality of ensembles 90a1 to 90az, the time needed for the annealing operations (for example, the numbers cnt1 and cnt2 illustrated in FIG. 16) is shortened. Even with the time shortened, a value closer to an optimal solution is still obtained.

Figure 24:
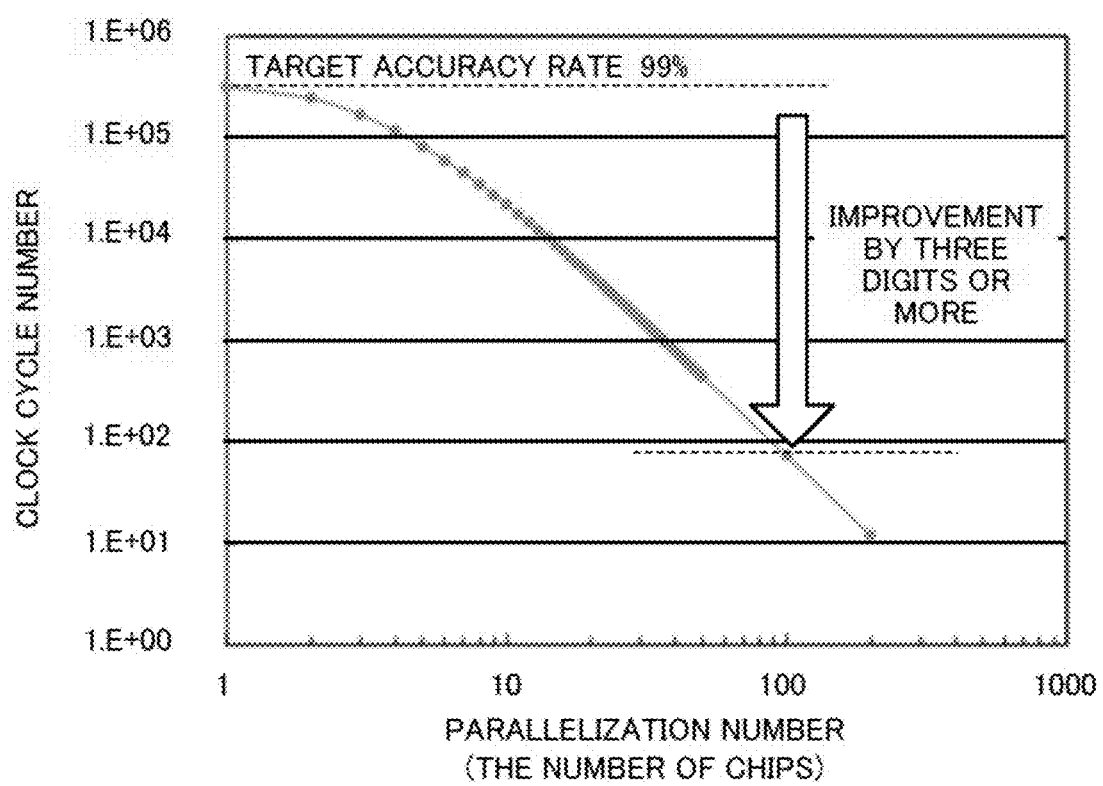
FIG. 24 illustrates an advantageous effect provided by the faster calculation method using parallelization.

FIG. 24 illustrates an advantageous effect provided by the faster calculation method using parallelization.

FIG. 24 illustrates a simulation result of the clock cycle number achieving the target accuracy rate 99% when an information processing apparatus performs parallel calculation on a problem that occurs randomly by using each of the ensembles 90a1 to 90az in FIG. 23 as a single chip (a single ising device). The clock cycle number is the cycle number of a clock signal supplied to the registers 25a1 to 25an of the neuron circuits 10a1 to 10an illustrated in FIG. 2. In addition, each of the ensembles 90a1 to 90az includes 64 neuron circuits.

In FIG. 24, the vertical axis represents the clock cycle number, and the horizontal axis represents the parallelization number (the number of chips).

As illustrated in FIG. 24, the clock cycle number achieving the target accuracy rate 99% decreases as the parallelization number increases. For example, the clock cycle number when the parallelization number is 100 is less by three digits or more than that of when no parallelization is performed. Namely, faster calculation is achieved.

As a faster calculation method, a quantum Monte Carlo method may be applied.

Figure 25:
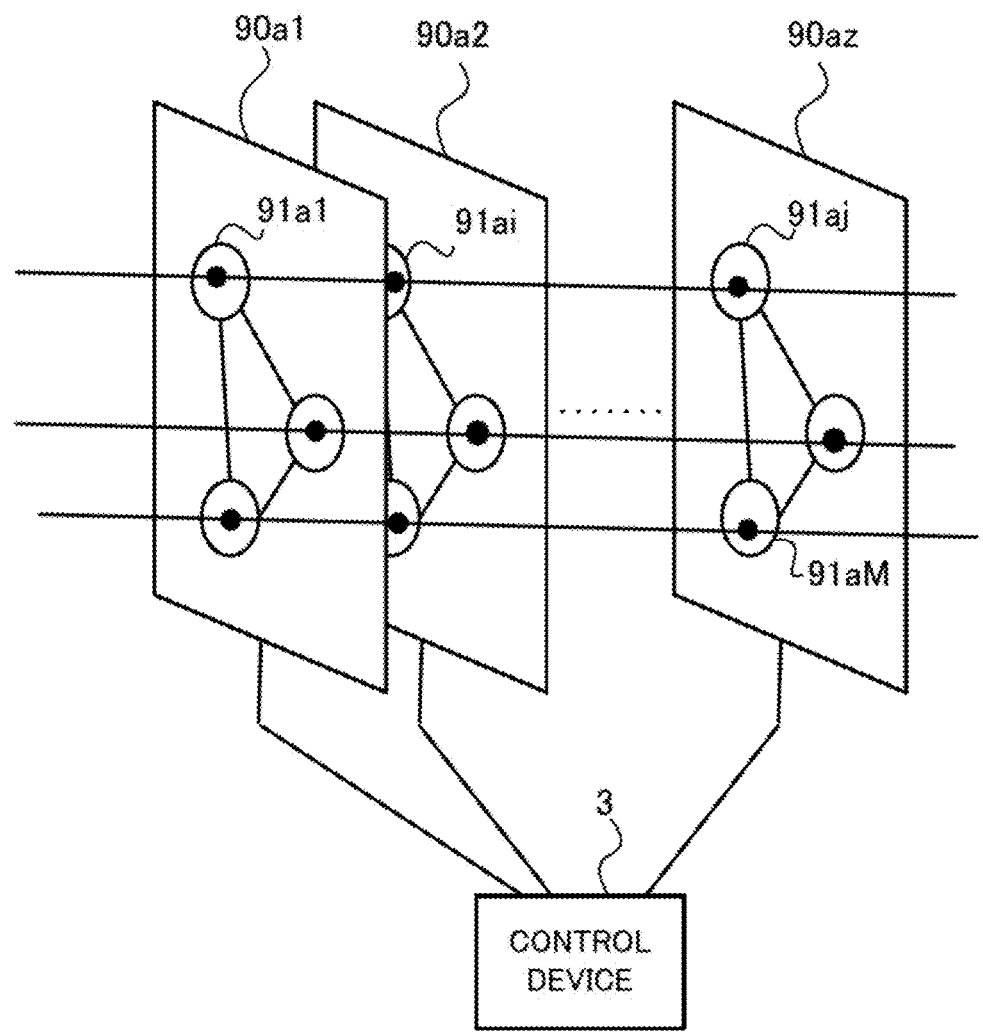
FIG. 25 illustrates a faster calculation method using a quantum Monte Carlo method.

FIG. 25 illustrates a faster calculation method using a quantum Monte Carlo method. Like reference characters refer to like elements in FIGS. 23 and 25.

In the quantum Monte Carlo method, as in the parallelization method illustrated in FIG. 23, while the same problem is mapped with each of a plurality of ensembles 90a1 to 90az, neuron circuits of neighboring ensembles are connected to each other (the weight value is 1). For example, neuron circuits 91a1, 91ai, and 91aj are connected to each other.

The control device 3 solves a problem by recognizing the problem as a large problem established by z ensembles 90a1 to 90az.

Detailed description of the quantum Monte Carlo method will be omitted (about the quantum Monte Carlo method, see 'M. Suzuki, "Relationship between d-Dimensional Quantal Spin Systems and (d+1)-Dimensional Ising Systems", Progress of Theoretical Physics, Vol. 56, No. 5, pp. 1454-1469, (1976)' and 'G. E. Santoro, R. Martonak, E. Tosatti, and R. Car, "Theory of Quantum Annealing of an Ising Spin Glass", Science Vol. 295, pp. 2427-2430, (2002)'.

(Another Example of Neuron Circuits)

Figure 26:
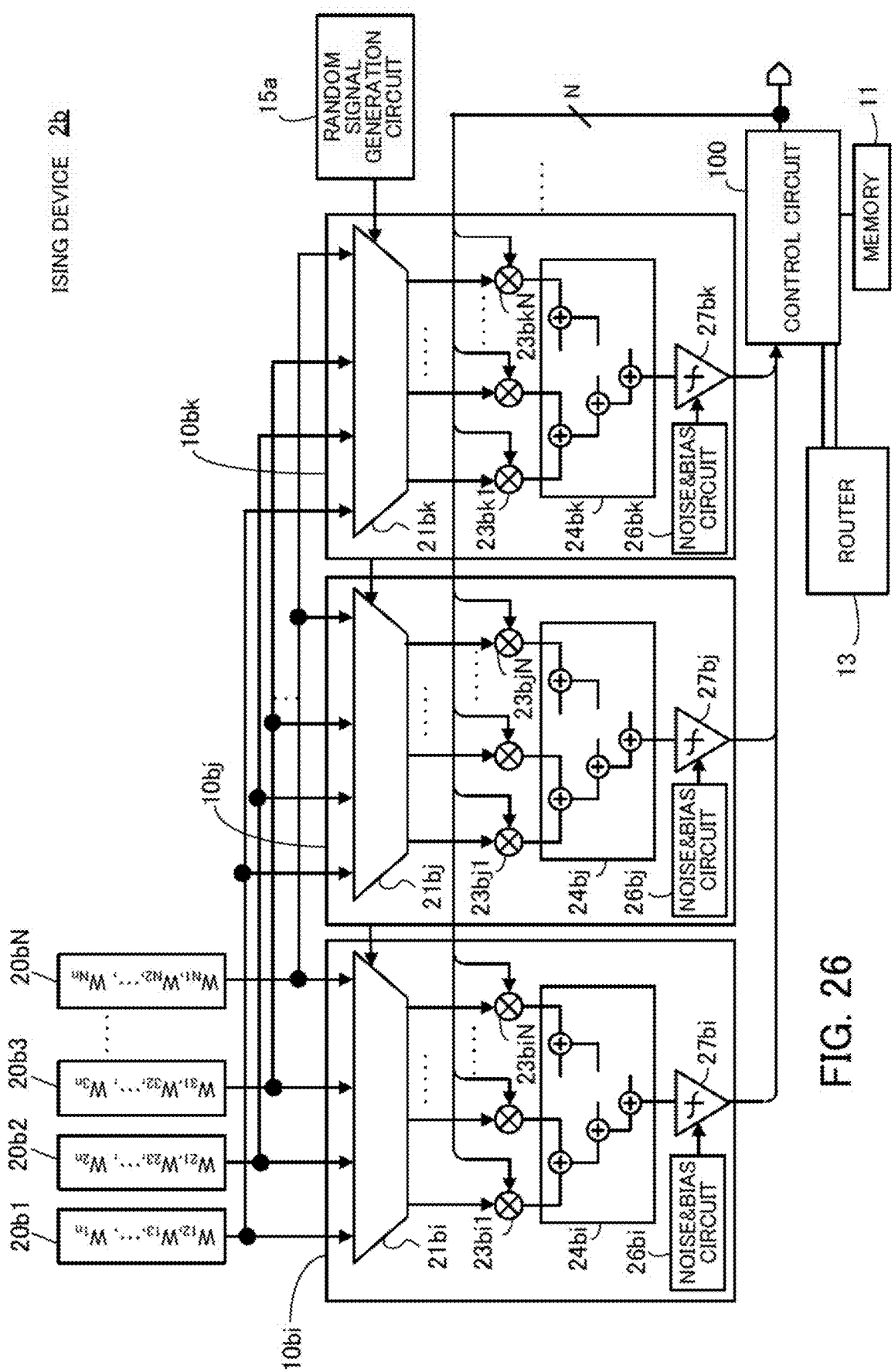
FIG. 26 illustrates an example of an ising device including neuron circuits different from the neuron circuits illustrated in FIG. 2.

FIG. 26 illustrates an example of an ising device 2b including neuron circuits different from the neuron circuits illustrated in FIG. 2.

The ising device 2b includes registers 20b1 to 20bN. Each of the registers 20b1 to 20bN holds weight values. The weight values include at least one weight value that indicates connection strength between a corresponding neuron circuit and one of the other neuron circuits within the chip and includes at least one weight value that indicates connection strength between the corresponding neuron circuit and one of the neuron circuits outside the chip.

For example, when the number of neuron circuits in the chip is n, the register 20b1 holds weight values $W_{12}$ to $W_{1n}$ each of which indicates connection strength between the first neuron circuit in the chip and one of the other neuron circuits in the chip.

In addition, assuming that the neuron circuits in the chip are connected to N-n neuron circuits outside the chip, the register 20bN holds weight values $W_{N1}$ to $W_{Nn}$ each of which indicates connection strength between one of the neuron circuits in the chip and one of the N-n neuron circuits outside the chip.

In addition, the ising device 2b includes a plurality of (n) neuron circuits. For example, FIG. 26 illustrates the i-th, j-th, and k-th neuron circuits 10bi, 10bj, and 10bk, respectively, of all the n neuron circuits.

The neuron circuit 10bi includes a selection circuit 21bi, multiplier circuits 23bi1 to 23biN, an adder unit 24bi, a noise&bias circuit 26bi, and a comparator circuit 27bi. The neuron circuit 10bj includes a selection circuit 21bj, multiplier circuits 23bj1 to 23bjN, an adder unit 24bj, a noise&bias circuit 26bj, and a comparator circuit 27bj. The neuron circuit 10bk includes a selection circuit 21bk, multiplier circuits 23bk1 to 23bkN, an adder unit 24bk, a noise&bias circuit 26bk, and a comparator circuit 27bk.

Each of the neuron circuits 10bi, 10bj, and 10bk calculates a local field value as illustrated in expression (2), adds a noise value thereto, compares a sum with a threshold, and outputs a comparison result.

Hereinafter, the neuron circuit 10bi will be described as an example.

In accordance with any of the selection signals 1 to n outputted from a random signal generation circuit 15a, the selection circuit 21bi selects and outputs a group of weight values stored in any one of the registers 20b1 to 20bN.

Each of the multiplier circuits 23bi1 to 23biN multiplies the state of an individual one of the N neuron circuits outputted by a control circuit 100 by a corresponding one of the weight values.

The adder unit 24bi adds up the values outputted by the multiplier circuits 23bi1 to 23biN.

The comparator circuit 27bi compares a value, which is obtained by adding a noise value and a bias value outputted by the noise&bias circuit 26bi to the value outputted by the adder unit 24bi, with a threshold and outputs a comparison result.

The control circuit 100 receives an updated value of a neuron circuit of another chip, the chip address of the chip including the neuron circuit, and the internal address of the neuron circuit via a router 13. Next, when the control circuit 100 determines that the neuron circuit outside the chip is specified as a connection destination of the neuron circuits within the ising device 2b in accordance with the above connection destination information 70, the control circuit 100 reflects the updated value on the neuron circuits 10bi, 10bj, and 10bk.

The ising device 2b also provides the same advantageous effect.

While an aspect of the information processing apparatus, an aspect of an ising device, and an aspect of an information processing apparatus control method of the present technique have been described in accordance with the above embodiments, the above embodiments are only examples. The present technique is not limited to the above embodiments.

The information processing apparatus, the ising device, and the information processing apparatus control method discussed herein are capable of calculating a large-scale problem in which relatively many variables are used.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a plurality of ising devices arranged in a matrix and connected to each other via a bus; and
a control device,
wherein each of the ising devices includes:
a plurality of neuron circuits that each hold a first value based on a sum of values each obtained by multiplying one of a plurality of output signals from a plurality of connection destination neuron circuits by one of a plurality of weight values each representing connection strength between a corresponding neuron circuit and one of the plurality of connection destination neuron circuits, outputs 0 or 1 in accordance with a result of comparison between a second value obtained by adding a noise value to the first value with a threshold, receives an update signal when any one of the output signals changes, calculates a change amount of the first value in accordance with the update signal, and updates the first value by adding or subtracting the change amount to or from the first value,
a memory that holds connection destination information in which items of first address information that identify the respective connection destination neuron circuits, items of second address information that identify ising devices including the respective connection destination neuron circuits among all the plurality of ising devices, and items of identification information about the respective weight values are associated with each other,
a control circuit that outputs, when a first output signal of a first connection destination neuron circuit included in a first ising device other than the ising device including the control circuit among all the plurality of connection destination neuron circuits changes, a value corresponding to the first output signal that has changed and the update signal based on the connection destination information, and
a router that receives a mode set value and determines whether to connect at least two neighboring ising devices, or a neighboring ising device and the control circuit in accordance with the mode set value,
wherein the control device transmits the mode set value to the router.

2. The information processing apparatus according to claim 1,
wherein the plurality of ising devices are connected to each other via a scan chain, and
wherein the router includes a port for outputting and inputting scan data transmitted from any one of the plurality of ising devices.

3. The information processing apparatus according to claim 2, wherein the scan data is the mode set value or the second address information.

4. The information processing apparatus according to claim 1, wherein, of all the plurality of ising devices, ising devices arranged at both ends in a row or a column are connected to each other via the bus.

5. The information processing apparatus according to claim 1, wherein the control device selects the first ising device from the plurality of ising devices and determines the mode set value so that the value corresponding to the first output signal that has changed and one of the items of first address information that identifies the first connection destination neuron circuit are transmitted to at least one of the plurality of ising devices other than the first ising device via the bus.

6. An ising device comprising:
- a plurality of neuron circuits that each hold a first value based on a sum of values each obtained by multiplying one of a plurality of output signals from a plurality of connection destination neuron circuits by one of a plurality of weight values each representing connection strength between a corresponding neuron circuit and one of the plurality of connection destination neuron circuits, outputs 0 or 1 in accordance with a result of comparison between a second value obtained by adding a noise value to the first value with a threshold, receives an update signal when any one of the output signals changes, calculates a change amount of the first value in accordance with the update signal, and updates the first value by adding or subtracting the change amount to or from the first value;
- a memory that holds connection destination information in which items of first address information that identify the respective connection destination neuron circuits, items of second address information that identify ising devices including the respective connection destination neuron circuits, and items of identification information about the respective weight values are associated with each other;
- a control circuit that outputs, when a first output signal of a first connection destination neuron circuit included in a first ising device other than the ising device including the control circuit among all the plurality of connection destination neuron circuits changes, a value corresponding to the first output signal that has changed and the update signal based on the connection destination information; and
- a router that receives a mode set value and determines whether to connect at least two neighboring ising devices, or a neighboring ising device and the control circuit in accordance with the mode set value.

7. An information processing apparatus control method performed on a plurality of ising devices arranged in a matrix and connected to each other via a bus, each of the ising devices including a plurality of neuron circuits that each hold a first value based on a sum of values each obtained by multiplying one of a plurality of output signals from a plurality of connection destination neuron circuits by one of a plurality of weight values each representing connection strength between a corresponding neuron circuit and one of the plurality of connection destination neuron circuits, outputs 0 or 1 in accordance with a result of comparison between a second value obtained by adding a noise value to the first value with a threshold, receives an update signal when any one of the output signals changes, calculates a change amount of the first value in accordance with the update signal, and updates the first value by adding or subtracting the change amount to or from the first value, a memory that holds connection destination information in which items of first address information that identify the respective connection destination neuron circuits, items of second address information that identify ising devices including the respective connection destination neuron circuits, and items of identification information about the respective weight values are associated with each other, a control circuit that outputs, when a first output signal of a first connection destination neuron circuit included in a first ising device other than the ising device including the control circuit among all the plurality of connection destination neuron circuits changes, a value corresponding to the first output signal that has changed and the update signal based on the connection destination information, and a router that receives a mode set value and determines whether to connect at least two neighboring ising devices, or a neighboring ising device and the control circuit in accordance with the mode set value, the information processing apparatus control method comprising:
- setting, by the control device, the plurality of weight values;
- selecting, by the control device, the first ising device, and
- determining, by the control device, the mode set value so that the value corresponding to the first output signal that has changed and an item of address information that identifies the first connection destination neuron circuit are transmitted to at least one of the plurality of ising devices other than the first ising device via the bus.

* * * * *